(12) United States Patent  (10) Patent No.: US 8,720,920 B2
Williams et al.  (45) Date of Patent: May 13, 2014

(54) SLEEVE, SUB-ASSEMBLY, VEHICULAR SUSPENSION ASSEMBLY AND METHODS FOR FORMING/ASSEMBLING THE SAME

(75) Inventors: Wilbert W. Williams, W. Bloomfield, MI (US); Richard Bayer, Northville, MI (US); Brian Bayer, Northville, MI (US); Adam Bayer, Northville, MI (US); Christopher Bayer, Northville, MI (US); Craig Williams, W. Bloomfield, MI (US)

(73) Assignee: Williams-Bayer Industries Inc., Westland, MI (US)

( * ) Notice: Subject to any disclaimer, the term of this patent is extended or adjusted under 35 U.S.C. 154(b) by 108 days.

(21) Appl. No.: 13/598,055

(22) Filed: Aug. 29, 2012

(65) Prior Publication Data

US 2014/0062050 A1  Mar. 6, 2014

(51) Int. Cl.
*B60G 9/00* (2006.01)
(52) U.S. Cl.
USPC ............. 280/124.116; 280/124.127; 16/2.2; 16/2.5; 267/140.11; 267/276
(58) Field of Classification Search
USPC ............. 280/124.116, 124.127; 16/2.2, 2.5; 267/140.11, 276; 384/428
See application file for complete search history.

(56) References Cited

U.S. PATENT DOCUMENTS

| | | | |
|---|---|---|---|
| 2,659,619 A * | 11/1953 | Kishline et al. | 267/293 |
| 2,937,040 A | 5/1960 | Hutton | |
| 3,230,000 A * | 1/1966 | Simpson | 403/228 |
| 3,471,164 A | 10/1969 | Tyerman | |
| 3,727,939 A | 4/1973 | Mykolenko | |
| 4,370,005 A | 1/1983 | Sarai et al. | |
| 5,275,429 A | 1/1994 | Bunker | |
| 5,516,083 A * | 5/1996 | Sprang et al. | 267/140.12 |
| 5,540,420 A * | 7/1996 | Luzsicza | 267/141.1 |
| 5,601,304 A | 2/1997 | Tilly et al. | |
| 6,324,744 B1 * | 12/2001 | Banks et al. | 29/525.13 |
| 6,430,774 B1 | 8/2002 | McLaughlin et al. | |
| 6,446,993 B1 | 9/2002 | Huszarik et al. | |
| 6,742,808 B1 * | 6/2004 | Kosak | 280/781 |
| 6,854,723 B2 | 2/2005 | Ogawa et al. | |
| 7,010,843 B2 * | 3/2006 | Haneishi et al. | 29/451 |
| 7,114,712 B2 * | 10/2006 | Lewis et al. | 267/141 |
| 7,204,479 B2 * | 4/2007 | Power et al. | 267/140.12 |
| 7,451,967 B2 | 11/2008 | McLaughlin et al. | |
| 8,424,855 B1 * | 4/2013 | Verbowski | 267/141.7 |
| 8,579,510 B2 * | 11/2013 | Noble et al. | 384/428 |
| 2004/0046298 A1* | 3/2004 | Takeshita et al. | 267/293 |

FOREIGN PATENT DOCUMENTS

| | | |
|---|---|---|
| CN | 201856594 U | 6/2011 |
| DE | 102010041217 A1 | 3/2012 |

* cited by examiner

*Primary Examiner* — Toan To
(74) *Attorney, Agent, or Firm* — Honigman Miller Schwartz and Cohn LLP

(57) ABSTRACT

A sleeve for assembling into a sub-assembly including a control arm of a vehicular suspension assembly prepared by a process is disclosed. The process includes the steps of: providing a tubular segment; firstly shaping a first portion of the tubular segment to include a proximal flange; secondly shaping a second portion of the tubular segment to include a distal flange. A third portion of the tubular segment forms an intermediate body extending between the proximal flange and the distal flange. The length of the tubular segment includes a substantially constant and uniform thickness after the firstly shaping step and the secondly step. A sleeve is also disclosed. A sub-assembly. A portion of a vehicular suspension assembly is also disclosed.

12 Claims, 14 Drawing Sheets

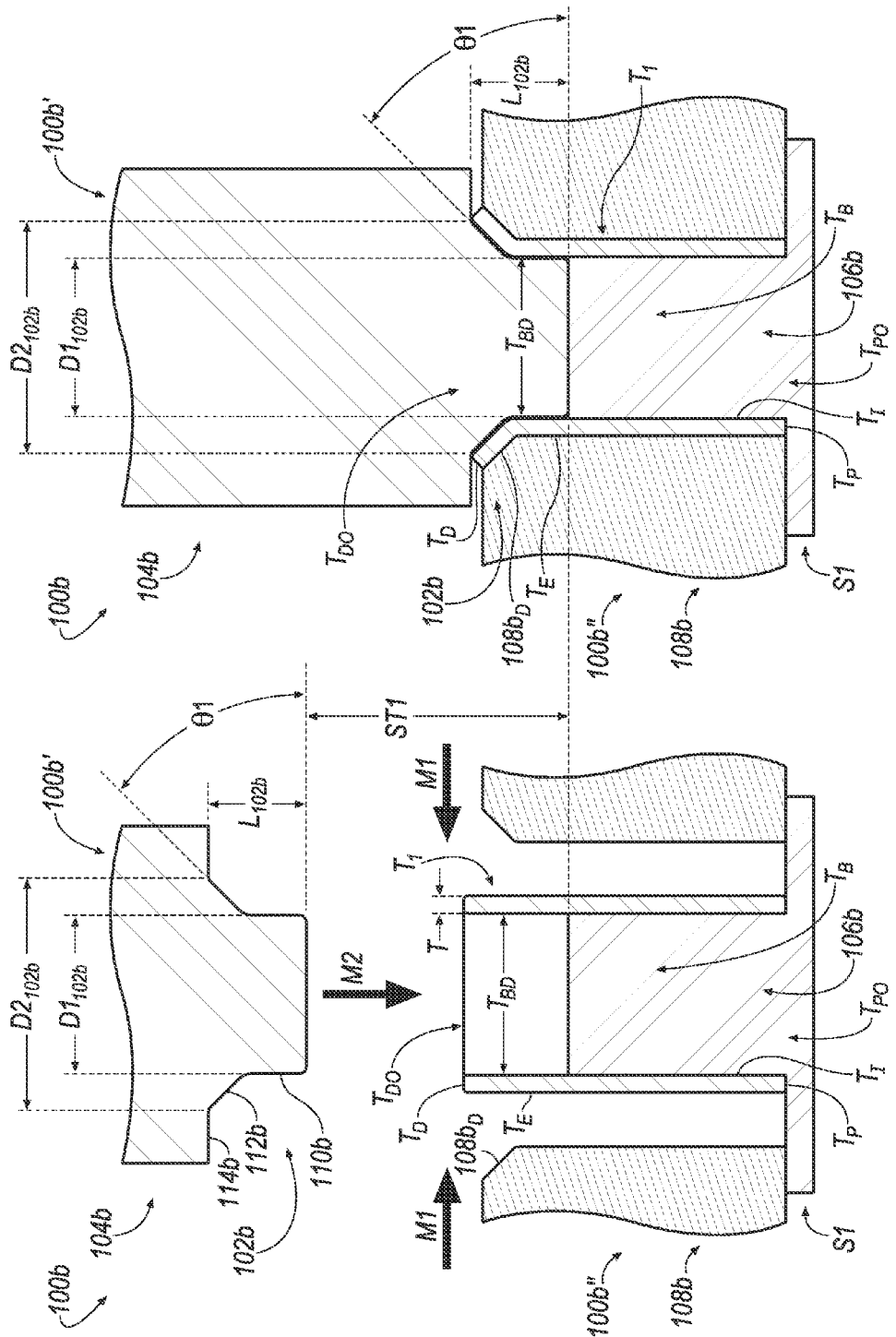

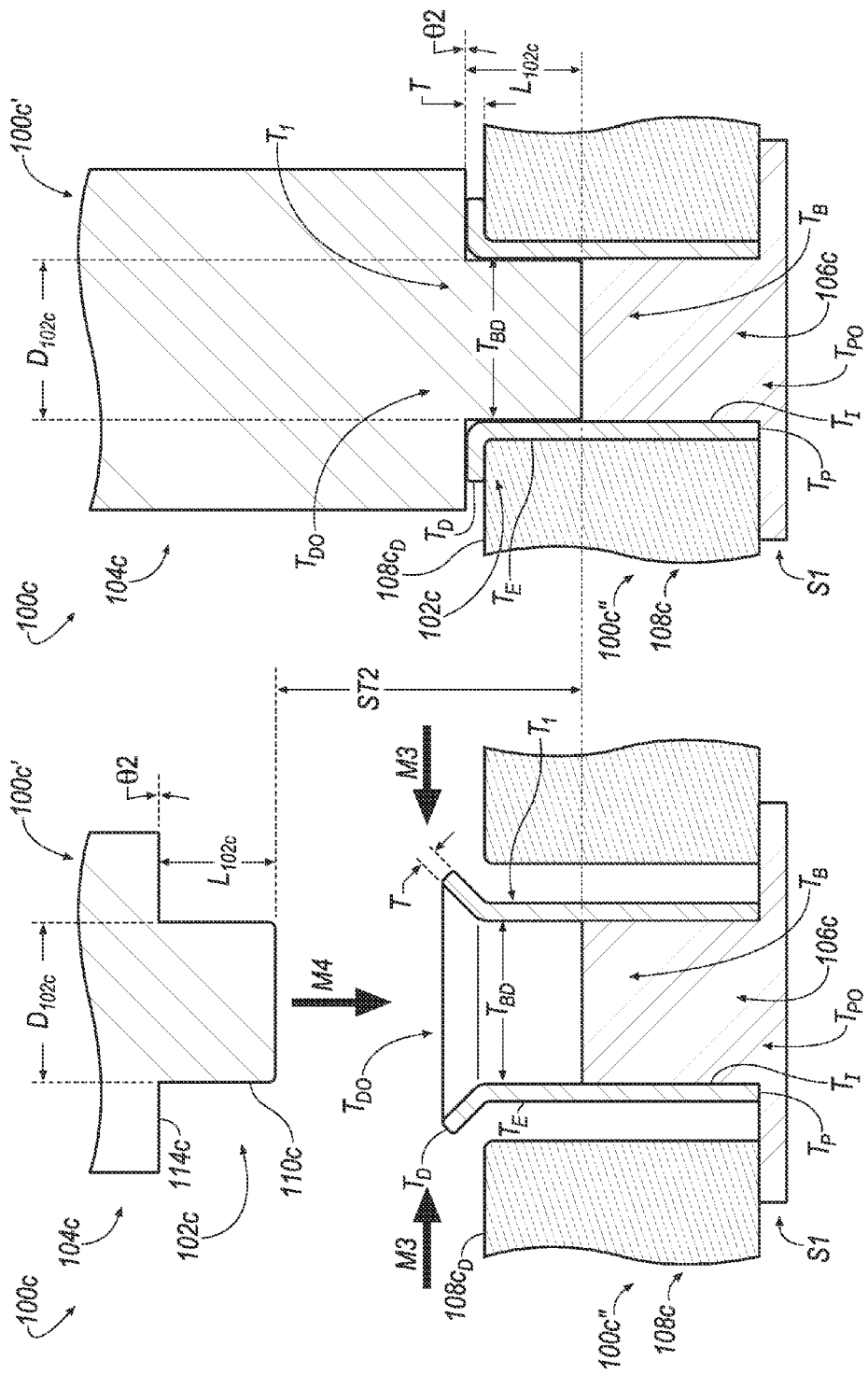

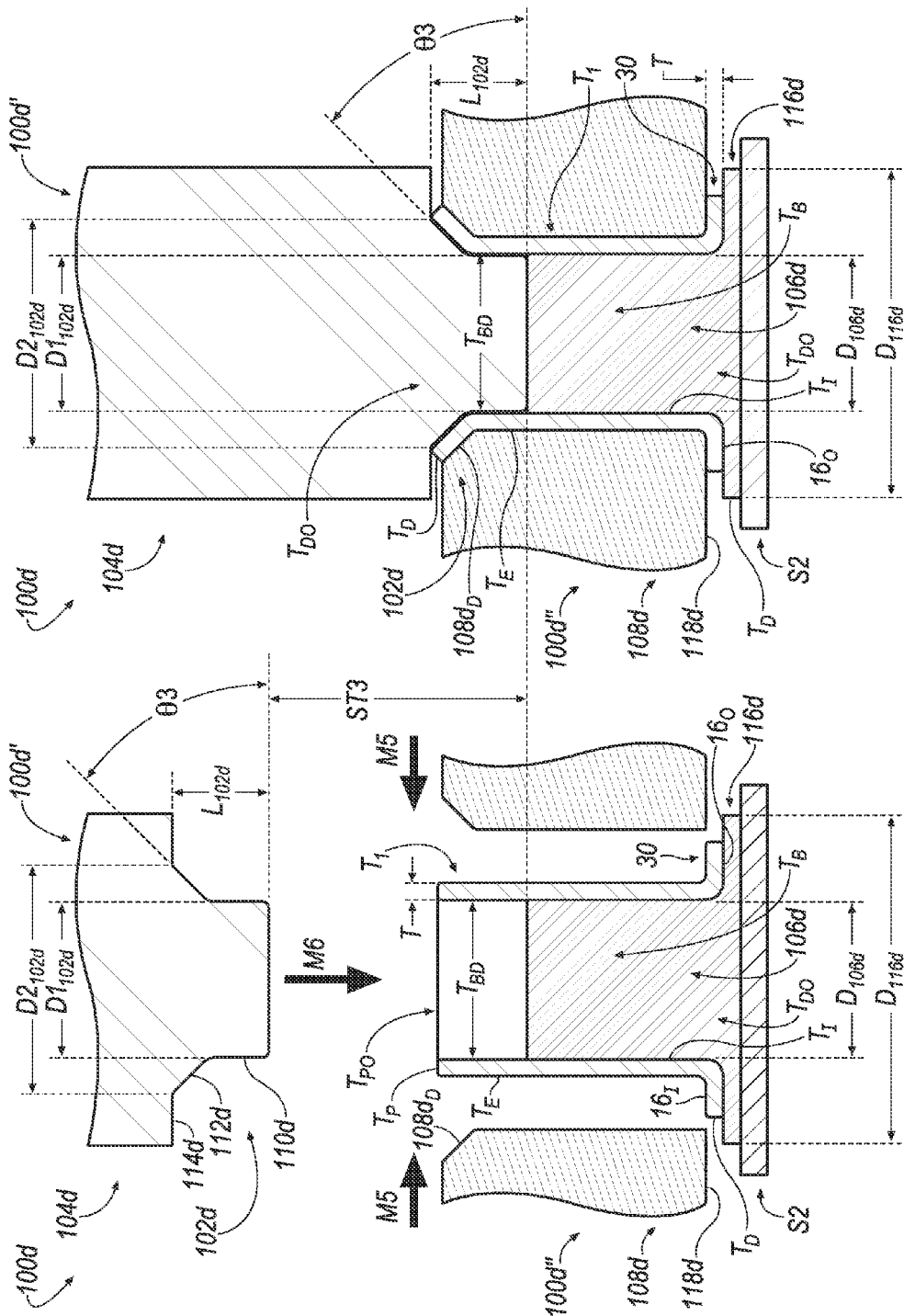

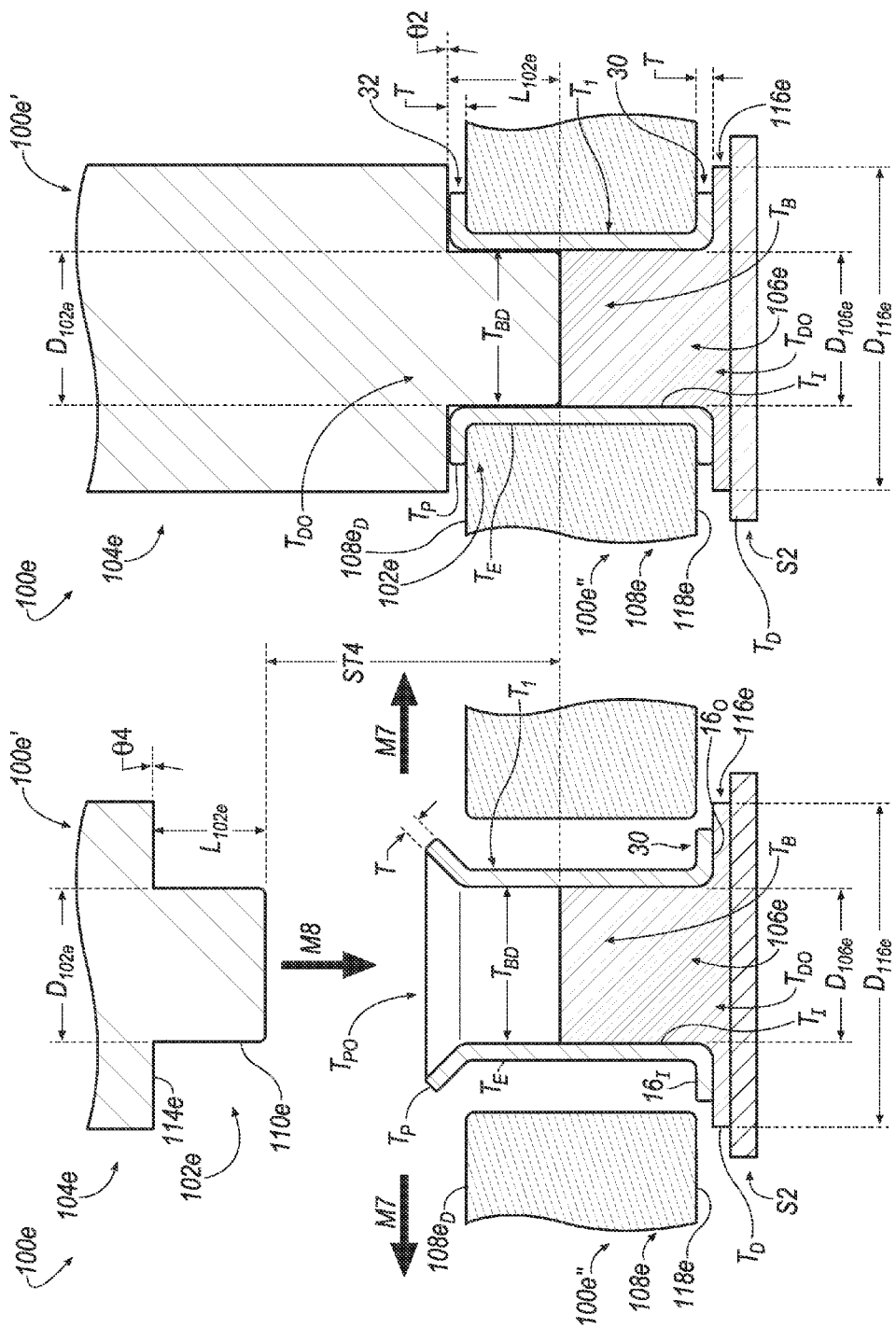

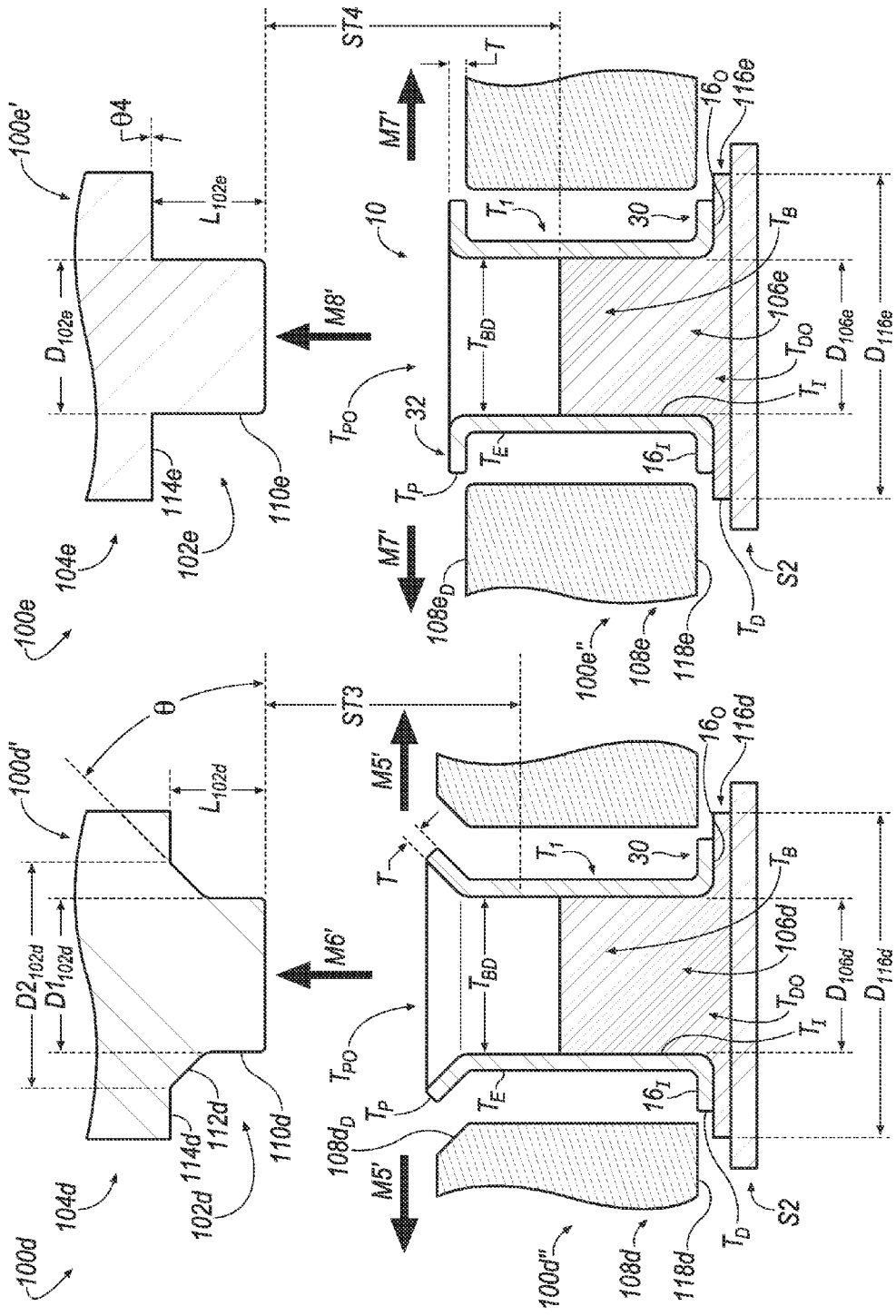

SLEEVE, SUB-ASSEMBLY, VEHICULAR SUSPENSION ASSEMBLY AND METHODS FOR FORMING/ASSEMBLING THE SAME

TECHNICAL FIELD

The invention relates to a sleeve, sub-assembly, vehicular suspension assembly and methods for forming/assembling the same.

BACKGROUND

Various structural components are formed/assembled in a variety of methodologies. While known methodologies for forming/assembling structural components have proven to be acceptable for various applications, such methodologies are nevertheless susceptible to improvements that may enhance the overall performance of the formed/assembled structure as well as the cost of the formed/assembled structure. Therefore, a need exists to develop improved formed/assembled structures and methodologies for forming/assembling the same that advance the art.

SUMMARY

In some implementations, a sleeve for assembling into a sub-assembly including a control arm of a vehicular suspension assembly prepared by a process includes the step of providing a tubular segment having a length, a proximal end, a distal end, a bore extending through the tubular segment from the proximal end to the distal end and an interior surface defining the bore. The process may further include the step of firstly shaping a first portion of the length proximate the distal end of the tubular segment to include a proximal flange. The process may further include the step of secondly shaping a second portion of the length proximate the proximal end of the tubular segment to include a distal flange. A third portion of the length of the tubular segment forms an intermediate body extending between the proximal flange and the distal flange. The length of the tubular segment includes a substantially constant and uniform thickness after the firstly shaping step and the secondly step.

In some examples, the providing step includes the step of: obtaining the tubular segment from a length of the tube-shaped stock material.

In some instances, the obtaining step further includes the step of: arranging the length of tube-shaped stock material upon a rotating device of a lathe. The obtaining step may further include the step of utilizing the rotating device of the lathe for rotating the length of the tube-shaped stock material. The obtaining step may further include the step of utilizing a cutting member of the lathe for trimming a portion of the length of the tube-shaped stock material equal to the length of the tubular segment. The trimmed portion of the length of the tube-shaped stocked material is the tubular segment.

In some examples, the firstly shaping step includes the steps of: arranging the proximal end of the tubular segment upon a first support member, moving a first flange-shaping head including a surface geometry defined at least in part by a first angle from: a first orientation away from and not in contact with one or more of the distal end and the interior surface of the tubular segment to a second orientation in contact with one or more of the distal end and the interior surface of the tubular segment for: deforming the first portion of the length of the tubular segment proximate the distal end of the tubular segment outwardly at an angle substantially similar to the first angle of the surface geometry of the first flange-shaping head.

In some instances, the first angle is approximately 45°.

In some examples, the firstly shaping step further includes the steps of: moving a second flange-shaping head including a surface geometry defined by a second angle from: a first orientation away from and not in contact with one or more of the distal end and the interior surface of the tubular segment to a second orientation in contact with one or more of the distal end and the interior surface of the tubular segment for: further deforming the first portion of the length of the tubular segment proximate the distal end of the tubular segment further outwardly at an angle substantially similar to the second angle of the surface geometry of the second flange-shaping head for forming the proximal flange of the sleeve.

In some instances, the second angle is approximately 0°.

In some examples, after the firstly shaping step but prior to the secondly shaping step, the process further includes the steps of: removing the tubular segment from being arranged upon the first support member and arranging an outwardly-facing surface portion of the proximal flange of the sleeve upon a second support member such that the proximal flange is disposed adjacent the second support member while the proximal end of the tubular segment faces away from the second support member.

In some instances, the secondly shaping step includes the steps of: moving a third flange-shaping head including a surface geometry defined at least in part by a third angle from: a first orientation away from and not in contact with one or more of the proximal end and the interior surface of the tubular segment to a second orientation in contact with one or more of the proximal end and the interior surface of the tubular segment for: deforming the second portion of the length of the tubular segment proximate the distal end of the tubular segment outwardly at an angle substantially similar to the third angle of the surface geometry of the third flange-shaping head.

In some examples, the third angle is approximately 45°.

In some instances, the secondly shaping step further includes the steps of: moving a fourth flange-shaping head including a surface geometry defined by a fourth angle from: a first orientation away from and not in contact with one or more of the proximal end and the interior surface of the tubular segment to a second orientation in contact with one or more of the proximal end and the interior surface of the tubular segment for: further deforming the first portion of the length of the tubular segment proximate the proximal end of the tubular segment further outwardly at an angle substantially similar to the fourth angle of the surface geometry of the fourth flange-shaping head for forming the distal flange of the sleeve.

In some examples, the fourth angle is approximately 0°.

In some implementations, a sleeve for assembling into a sub-assembly including a control arm of a vehicular suspension assembly, includes a plurality of surfaces defining a proximal flange and a distal flange joined by an intermediate body. The plurality of surfaces include: an interior body surface diametrically opposed to an exterior body surface, a proximal flange surface and a distal flange surface. The proximal flange surface includes an inwardly-facing surface portion that is diametrically-opposed to the outwardly-facing surface portion and a side-surface portion that joins the inwardly-facing surface portion to the outwardly-facing surface portion. The distal flange surface includes an inwardly-facing surface portion that is diametrically-opposed to the outwardly-facing surface portion. The distal flange surface is further defined to include a side-surface portion that joins the inwardly-facing surface portion to the outwardly-facing surface portion. The plurality of surfaces further include: an interior proximal arcuate surface, an interior distal arcuate surface, an exterior proximal arcuate surface and an exterior distal arcuate surface. The interior proximal arcuate surface is arranged opposite of the exterior proximal arcuate surface. The interior distal arcuate surface is arranged opposite of the exterior distal arcuate surface. The interior proximal arcuate surface connects the interior body surface to the outwardly-facing surface portion of the proximal flange surface. The interior distal arcuate surface connects the interior body surface to the outwardly-facing surface portion of the distal flange surface. The exterior proximal arcuate surface connects the exterior body surface to the inwardly-facing surface portion of the proximal flange surface. The exterior distal arcuate surface connects the exterior body surface to the inwardly-facing surface portion of the distal flange surface. Each of the proximal flange, distal flange and intermediate body include a substantially similar, constant thickness.

In some examples, the interior body surface defines at least a portion of a passage extending through a length of the sleeve from the outwardly-facing surface portion of the proximal flange surface to the outwardly-facing surface portion of the distal flange surface. The passage defines the sleeve to form a substantially tubular geometry.

In some instances, the sleeve includes a sub-length of the length that is defined by: approximately about a region of the sleeve where the exterior proximal arcuate surface meets the inwardly-facing surface portion of the proximal flange surface and approximately about a region where the exterior distal arcuate surface meets the inwardly-facing surface portion of the distal flange surface.

In some examples, each of the inwardly-facing surface portion and the outwardly-facing surface portion of the proximal flange surface are substantially perpendicular with respect to the exterior body surface. The side-surface portion of the proximal flange surface is substantially parallel to the exterior body surface.

In some instances, each of the inwardly-facing surface portion and the outwardly-facing surface portion of the distal flange surface are substantially perpendicular with respect to the exterior body surface. The side-surface portion of the distal flange surface may be substantially parallel to the exterior body surface.

In some implementations, a sub-assembly of a vehicular suspension assembly, includes a control arm and a sleeve joined to the control arm. The control arm includes a sleeve-receiving portion. The sleeve-receiving portion forms a recess bound by a length of the sleeve-receiving portion extending between a proximal end of the sleeve-receiving portion and the distal end of the sleeve-receiving portion. The sleeve includes a length and a sub-length of the length extending between approximately about a region of the sleeve where an exterior proximal arcuate surface of the sleeve meets an inwardly-facing surface portion of a proximal flange surface of the sleeve and approximately about a region where an exterior distal arcuate surface of the sleeve meets an inwardly-facing surface portion of a distal flange surface of the sleeve. The length of the sleeve-receiving portion forming the recess is substantially equal to but slightly less than the sub-length of the sleeve. The sub-length of the sleeve is arranged within the recess.

In some examples, the sleeve is friction-fit within the recess of the sleeve-receiving portion of the control arm.

In some instances, the sub-assembly includes one or more weld beads applied upon one or more portions of an exterior body surface of the sleeve that is/are proximate a first side portion of the sleeve-receiving portion of the control arm and a second side portion of the sleeve-receiving portion of the control arm.

In some implementations, a portion of a vehicular suspension assembly includes a sub-assembly including a control arm and a sleeve joined to the control arm and a plurality of components connected to the sub-assembly including: a cross-member, a yoke, a tubular bushing, a fastener and a nut. The sub-assembly is connected to the cross-member. The yoke is arranged about the sleeve. The tubular bushing is inserted into a passage of the sleeve such that the tubular bushing extends through both of the sleeve and the yoke. The fastener is inserted into a bore or passage of the tubular bushing such that the fastener extends through: the bore of passage of the tubular bushing, the bore or passage of the sleeve and the yoke. The nut is secured to an end of the fastener that extends beyond an outer end surface of the yoke such that: the fastener removably-joins the yoke to the sleeve by way of the nut, the fastener and the tubular bushing.

In some examples, the control arm includes a sleeve-receiving portion. The sleeve-receiving portion forms a recess bound by a length of the sleeve-receiving portion extending between a proximal end of the sleeve-receiving portion and the distal end of the sleeve-receiving portion. The sleeve includes a length and a sub-length of the length extending between approximately about a region of the sleeve where an exterior proximal arcuate surface of the sleeve meets an inwardly-facing surface portion of a proximal flange surface of the sleeve and approximately about a region where an exterior distal arcuate surface of the sleeve meets an inwardly-facing surface portion of a distal flange surface of the sleeve. The length of the sleeve-receiving portion forming the recess is substantially equal to but slightly less than the sub-length of the sleeve. The sub-length of the sleeve is arranged within the recess.

In some instances, the sleeve is friction-fit within the recess of the sleeve-receiving portion of the control arm.

In some examples the portion of a vehicular suspension assembly includes one or more weld beads applied upon one or more portions of an exterior body surface of the sleeve that is/are proximate a first side portion of the sleeve-receiving portion of the control arm and a second side portion of the sleeve-receiving portion of the control arm.

DESCRIPTION OF THE DRAWINGS

The present disclosure will now be described, by way of example, with reference to the accompanying drawings, in which:

FIG. 1B' is a cross-sectional view of the sleeve of according to line 1B'-1B' of FIG. 1B.

FIGS. 6A-6C illustrates a series of section views of a portion of the device of FIG. 5 arranged in a plurality of orientations according to line 6A-6A of FIG. 5.

FIGS. 6D-6F illustrates a series of section views of a portion of the device of FIG. 5 arranged in a plurality of orientations according to line 6D-6D of FIG. 5.

FIGS. 8A-8C illustrates a series of section views of a portion of the device of FIG. 7 arranged in a plurality of orientations according to line 8A-8A of FIG. 7.

FIGS. 8D-8F illustrates a series of section views of a portion of the device of FIG. 7 arranged in a plurality of orientations according to line 8D-8D of FIG. 7.

DETAILED DESCRIPTION

The Figures illustrate exemplary embodiments of a sleeve, a sub-assembly including the sleeve, a vehicular suspension assembly including the sub-assembly and methods for forming/assembling the sleeve, sub-assembly and vehicular suspension assembly in accordance with embodiments of the invention. Based on the foregoing, it is to be generally understood that the nomenclature used herein is simply for convenience and the terms used to describe the invention should be given the broadest meaning by one of ordinary skill in the art.

Figure 1:
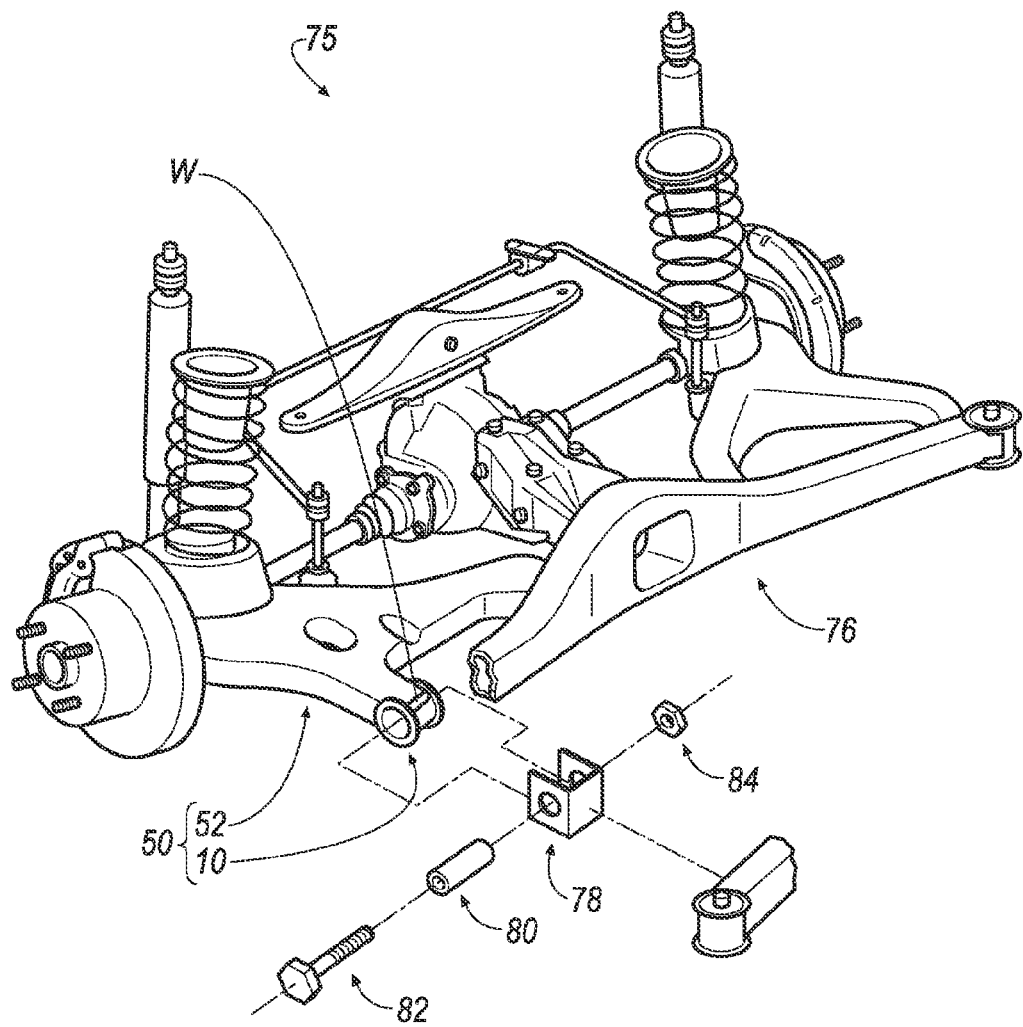
FIG. 1 is a perspective, partially exploded view of a vehicular suspension assembly.
Figure 1B:
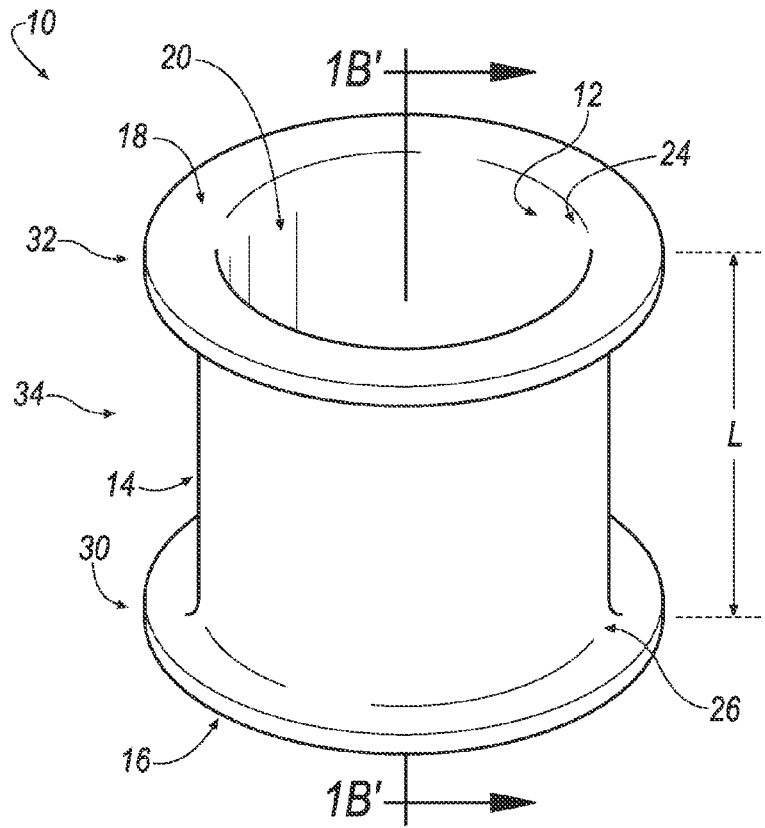
FIG. 1B is an enlarged perspective view of a sleeve of the vehicular suspension assembly FIG. 1.
Figure 1B:
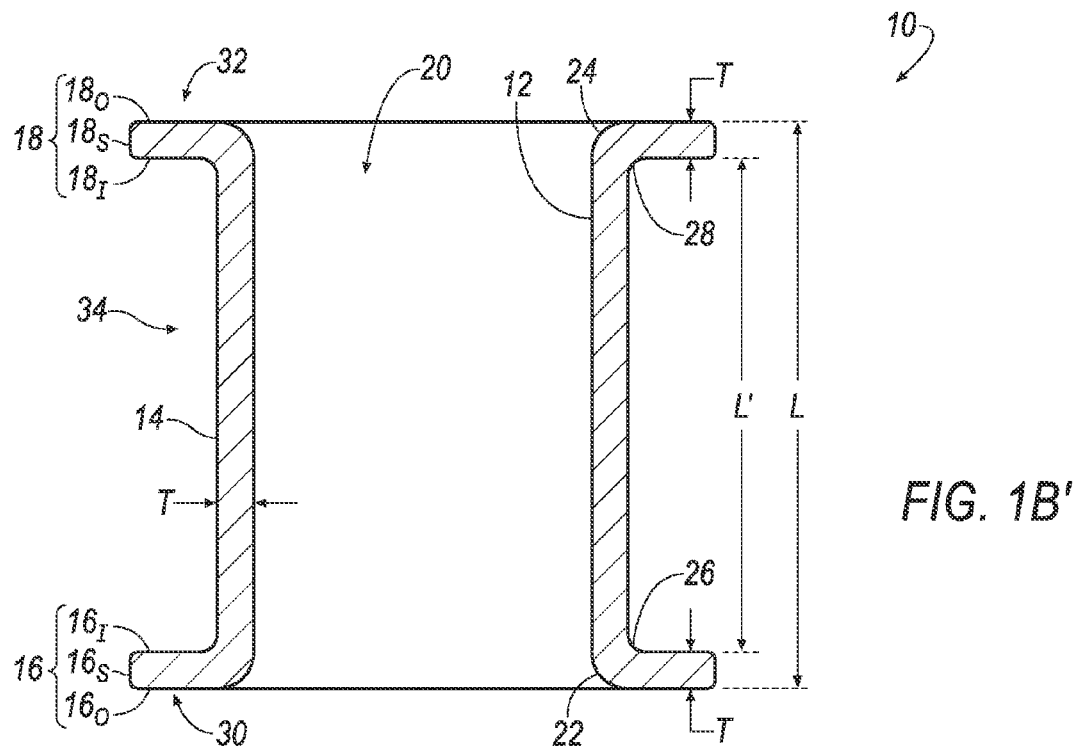

Referring to FIGS. 1-1B', a sleeve is shown generally at 10. The sleeve 10 may be a component of a sub-assembly shown generally at 50 (see FIGS. 1 and 2A-2B). In addition to the sleeve 10, the sub-assembly 50 may include at least a control arm 52.

Referring to FIG. 1, the sub-assembly 50 may be a component of a vehicular suspension assembly 75. The suspension assembly 75 may further include a plurality of components such as, for example: a cross-member 76, a yoke 78, a tubular bushing 80, a fastener 82 and a nut 84. In an implementation, the sub-assembly 50 may be attached to the cross-member 76 by: (1) arranging the yoke 78 about the sleeve 10 of the sub-assembly 50, (2) inserting the tubular bushing 80 into a bore or passage 20 (see FIG. 1B') of the sleeve 10 such that the tubular bushing 80 extends through both of the sleeve 10 and the yoke 78, (3) inserting the fastener 82 into a bore or passage of the tubular bushing 80 such that the fastener 82 extends through the bore of passage of the tubular bushing 80, the bore or passage 20 of the sleeve 10 and the yoke 78, and (4) securing the nut 84 to an end of the fastener 82 that extends beyond an outer end surface of the yoke 78 such that the fastener 84 removably-joins the yoke 84 to the sleeve 10 by way of the nut 84, the fastener 82 and the tubular bushing 80.

Because the yoke 78 is secured to the cross-member 76 (e.g., by a welded connection), the sleeve 10 is therefore indirectly secured to the cross-member 76 by way of the yoke 78, the tubular bushing 80, the fastener 82 and the nut 84. Further, because the sleeve 10 is a component of the sub-assembly 50 including the control arm 52, the control arm 52 is therefore indirectly secured to the cross-member 76 by way of the sleeve 10, the yoke 78, the tubular bushing 80, the fastener 82 and the nut 84.

Referring to FIGS. 1B and 1B', an embodiment of the sleeve 10 is shown. The sleeve 10 includes a plurality of surfaces 12-18 and 22-28. As shown in FIG. 1B', the plurality of surfaces may include: an interior body surface 12 and an exterior body surface 14. The interior body surface 12 is diametrically opposed to the exterior body surface 14. The plurality of surfaces of the sleeve 10 may further include a proximal flange surface 16 and a distal flange surface 18.

The interior body surface 12 may generally define at least a portion of a bore or passage 20 extending through a length, L, of the sleeve 10 from an outwardly-facing surface portion $16_O$ of the proximal flange surface 16 to an outwardly-facing surface portion $18_O$ of the distal flange surface 18. By inclusion of the bore or passage 20, the sleeve 10 may generally form a substantially tubular or tube-shaped geometry.

Referring to FIG. 1B', the sleeve 10 may be further defined to include: an interior proximal arcuate surface 22, an interior distal arcuate surface 24, an exterior proximal arcuate surface 26 and an exterior distal arcuate surface 28. The interior proximal arcuate surface 22 is arranged opposite of the exterior proximal arcuate surface 26. The interior distal arcuate surface 24 is arranged opposite of the exterior distal arcuate surface 28.

The proximal flange surface 16 may be defined to include an inwardly-facing surface portion $16_I$ that is diametrically-opposed to the outwardly-facing surface portion $16_O$. The proximal flange surface 16 may be further defined to include a side-surface portion $16_S$ that joins the inwardly-facing surface portion $16_I$ to the outwardly-facing surface portion $16_O$. Each of the inwardly-facing surface portion $16_I$ and the outwardly-facing surface portion $16_O$ of the proximal flange surface 16 may be substantially perpendicular with respect to the exterior body surface 14. The side-surface portion $16_S$ of the proximal flange surface 16 may be substantially parallel to the exterior body surface 14.

The distal flange surface 18 may be defined to include an inwardly-facing surface portion $18_I$ that is diametrically-opposed to the outwardly-facing surface portion $18_O$. The distal flange surface 18 may be further defined to include a side-surface portion $18_S$ that joins the inwardly-facing surface portion $18_I$ to the outwardly-facing surface portion $18_O$. Each of the inwardly-facing surface portion $18_I$ and the outwardly-facing surface portion $18_O$ of the distal flange surface 18 may be substantially perpendicular with respect to the exterior body surface 14. The side-surface portion $18_S$ of the distal flange surface 18 may be substantially parallel to the exterior body surface 14.

The interior proximal arcuate surface 22 connects the interior body surface 12 to the outwardly-facing surface portion $16_O$ of the proximal flange surface 16. The interior distal arcuate surface 24 connects the interior body surface 12 to the outwardly-facing surface portion $18_O$ of the distal flange surface 18.

The exterior proximal arcuate surface 26 connects the exterior body surface 14 to the inwardly-facing surface portion $16_I$ of the proximal flange surface 16. The exterior distal arcuate surface 28 connects the exterior body surface 14 to the inwardly-facing surface portion $18_I$ of the distal flange surface 18.

The surfaces 12-18 and 22-28 generally define the sleeve 10 to include a proximal flange 30 and a distal flange 32 joined by an intermediate body 34. Referring to FIG. 1B', each of the proximal flange 30, distal flange 32 and intermediate body 34 may include a substantially similar, constant thickness, T. The substantially similar thickness, T, may slightly vary proximate "shaped transition regions" that are formed by devices 100b-100e (see FIGS. 5 and 7) at about the location of the proximal arcuate surface 22, the interior distal arcuate surface 24, the exterior proximal arcuate surface 26 and the exterior distal arcuate surface 28 where the proximal flange 30 and the distal flange 32 each deviate away or extend away from the intermediate body 34 (i.e., the thickness extending between the interior/exterior proximal/distal arcuate surfaces 22, 26 and 24, 28 of the sleeve 10 may be approximately equal to but slightly less than or slightly greater than the substantially similar, constant thickness, T, defining the flanges 30, 32 and body 34 of the sleeve 10).

Figure 2A:
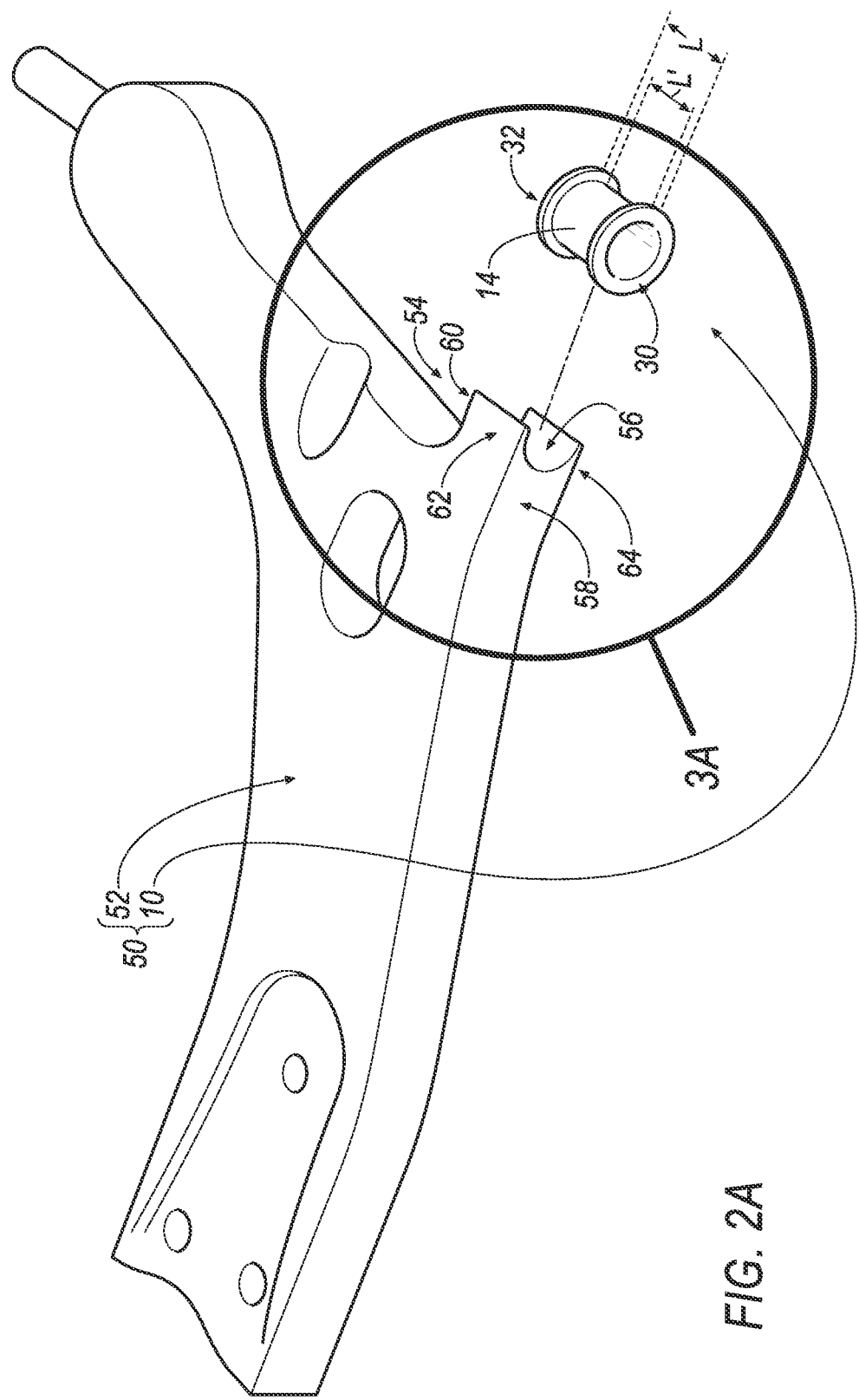
FIG. 2A is an enlarged perspective, non-assembled view of a sub-assembly of the vehicular suspension assembly of FIG. 1.
Figure 2B:
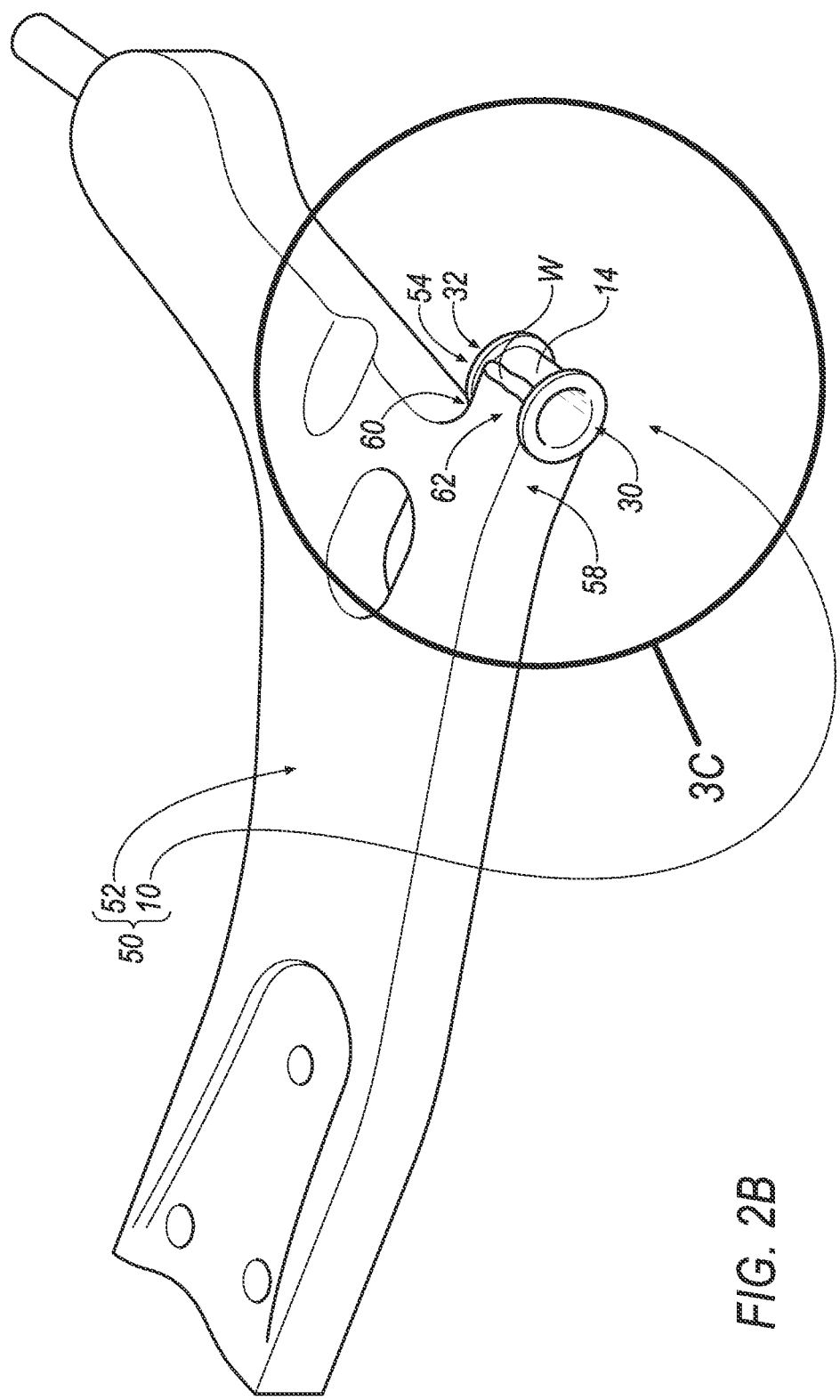
FIG. 2B is an enlarged perspective, assembled view of the sub-assembly of the vehicular suspension assembly of FIG. 1.

Referring to FIG. 2A, the sub-assembly 50 is shown in a first, non-assembled configuration (i.e., the sleeve 10 is not joined to the control arm 52). Referring to FIG. 2B, the sub-assembly 50 is shown in a second, assembled configuration (i.e., the sleeve 10 is joined to the control arm 52). When the sleeve 10 is joined to the control arm 52, the sleeve 10 may be said to be non-removably-joined to the control arm 52.

Figure 3A:
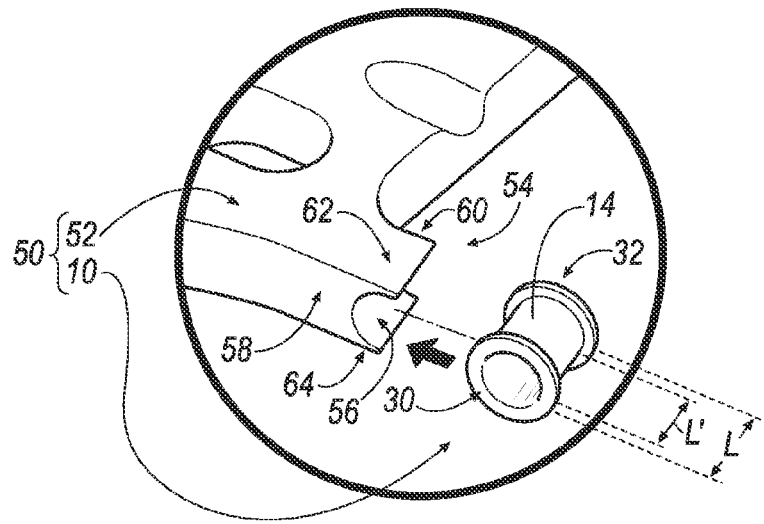
FIGS. 3A-3C illustrate enlarged views of the sub-assembly referenced from line 3A of FIG. 2A and line 3C of FIG. 2B.

Referring to FIGS. 2A and 3A, the control arm 52 may include a sleeve-receiving portion 54. The sleeve-receiving portion 54 may be defined by a recess 56, a proximal end 58, a distal end 60 a first side portion 62 and a second side portion 64.

The recess 56 may be generally defined by a substantially arcuate geometry. The proximal end 58 is opposite the distal end 60. The first side portion 62 is opposite the second side portion 64.

Referring to FIG. 3A, prior to joining the sleeve 10 to the control arm 52, the sleeve 10 is firstly arranged for "nesting" within the recess 56 of the sleeve-receiving portion 54 of the control arm 52. In an embodiment, the substantially arcuate geometry of the recess 56 substantially corresponds to at least a portion of a circular geometry of the exterior body surface 14 of the sleeve 10.

The recess 56 may be bound by a length extending between the proximal end 58 and the distal end 60 of the sleeve-receiving portion 54 of the control arm 52. The length of the recess 56 may be substantially equal to but slightly less than a sub-length, L' (see also FIG. 1B'), of the sleeve 10 that is defined by: approximately about a region of the sleeve 10 where the exterior proximal arcuate surface 26 meets the inwardly-facing surface portion $16_I$ of the proximal flange surface 16 and approximately about a region where the exterior distal arcuate surface 28 meets the inwardly-facing surface portion $18_I$ of the distal flange surface 18.

Figure 3B:
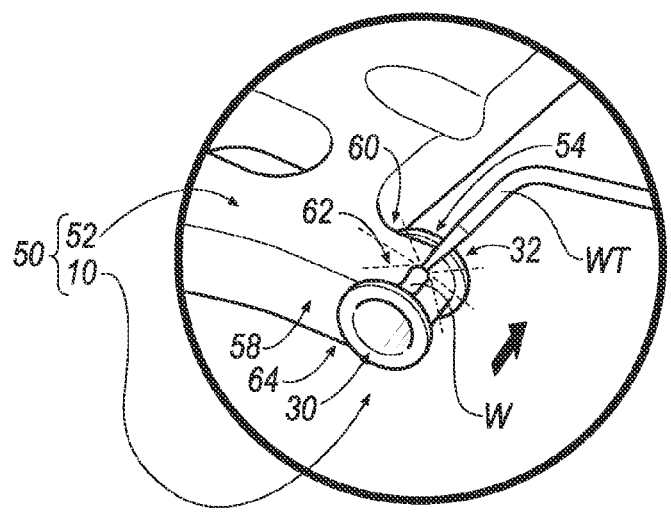

Referring to FIG. 3B, once the sleeve 10 is nested within the recess 56, the proximal flange 30 of the sleeve 10 may be disposed adjacent the proximal end 58 of the sleeve-receiving portion 54 of the control arm 52 (i.e., the inwardly-facing surface portion $16_I$ of the proximal flange surface 16 of the sleeve 10 may be disposed adjacent the proximal end 58 of the sleeve-receiving portion 54 of the control arm 52), and, the distal flange 32 of the sleeve 10 may be disposed adjacent the distal end 60 of the sleeve-receiving portion 54 of the control arm 52 (i.e., the inwardly-facing surface portion $18_I$ of the distal flange surface 18 of the sleeve 10 may be disposed adjacent the distal end 60 of the sleeve-receiving portion 54 of the control arm 52). In some implementations the inwardly-facing surface portion $16_I$ of the proximal flange surface 16 and the inwardly-facing surface portion $18_I$ of the distal flange surface 18 may be disposed directly adjacent the proximal end 58 of the sleeve-receiving portion 54 of the control arm 52 and the distal end 60 of the sleeve-receiving portion 54 of the control arm 52, respectively, such that the sleeve 10 may be friction-fit within recess 56 of the sleeve-receiving portion 54 of the control arm 52.

Figure 3C:
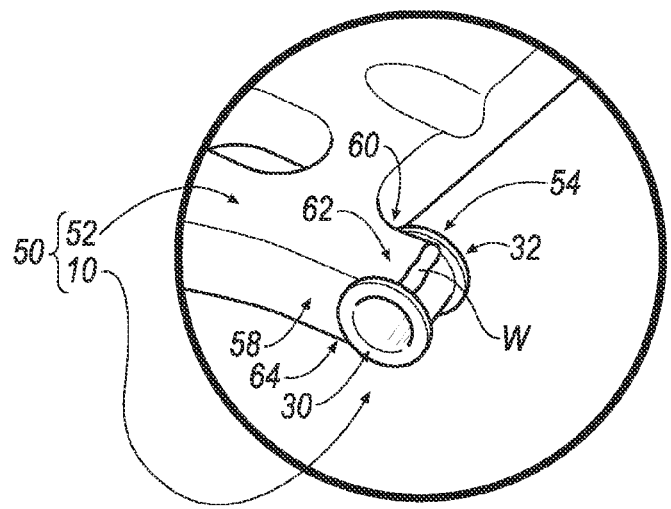

Referring to FIGS. 3B-3C, after nesting the sleeve 10 in the recess 56, the sleeve 10 may be non-removably-joined to the control arm 52. In an implementation, the sleeve 10 may be non-removably-joined to the control arm 52 by one or more weld beads, W. In an embodiment, the one or more weld beads, W, may be applied by a weld torch, WT (see FIG. 3B). In some examples, the one or more weld beads, W, may be applied upon one or more portions of the exterior body surface 14 that is/are proximate the first side portion 62 (as seen in FIGS. 3B and 3C) and the second side portion 64.

Referring to FIGS. 4A-8F, an implementation of one or more devices 100a-100e for forming the sleeve 10 is shown. Although a methodology is described in association with the one or more devices 100a-100e, the methodology should not be limited to or construed to be carried out by the one or more devices 100a-100e described in this disclosure.

Figure 4A:
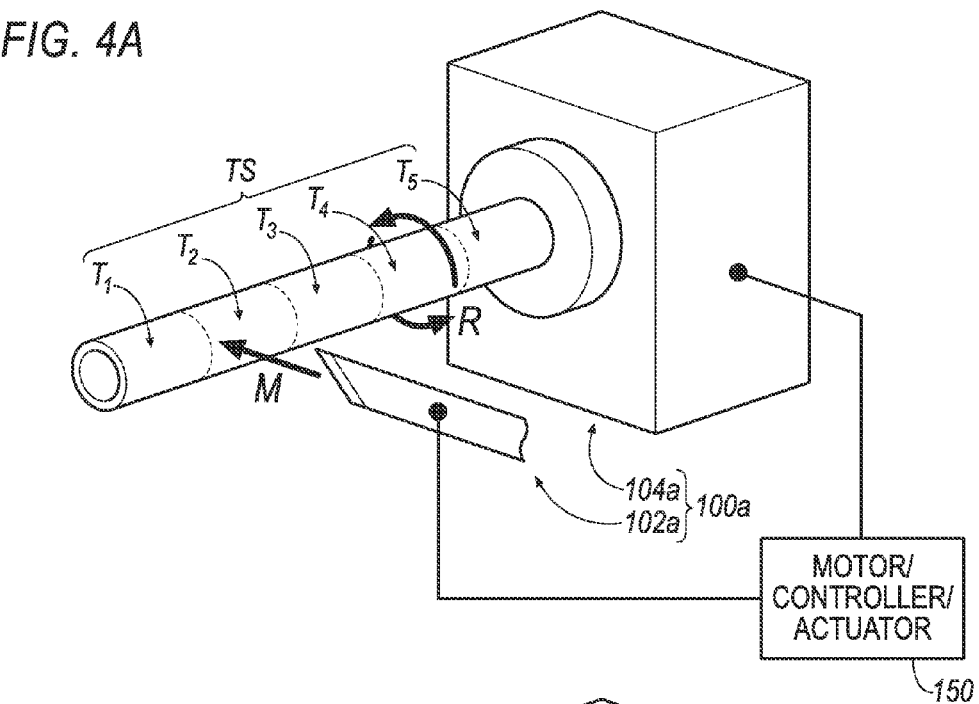
FIGS. 4A-4B illustrate an exemplary device that contributes to an embodiment of a methodology for forming the sleeve of FIG. 1B.
Figure 4B:
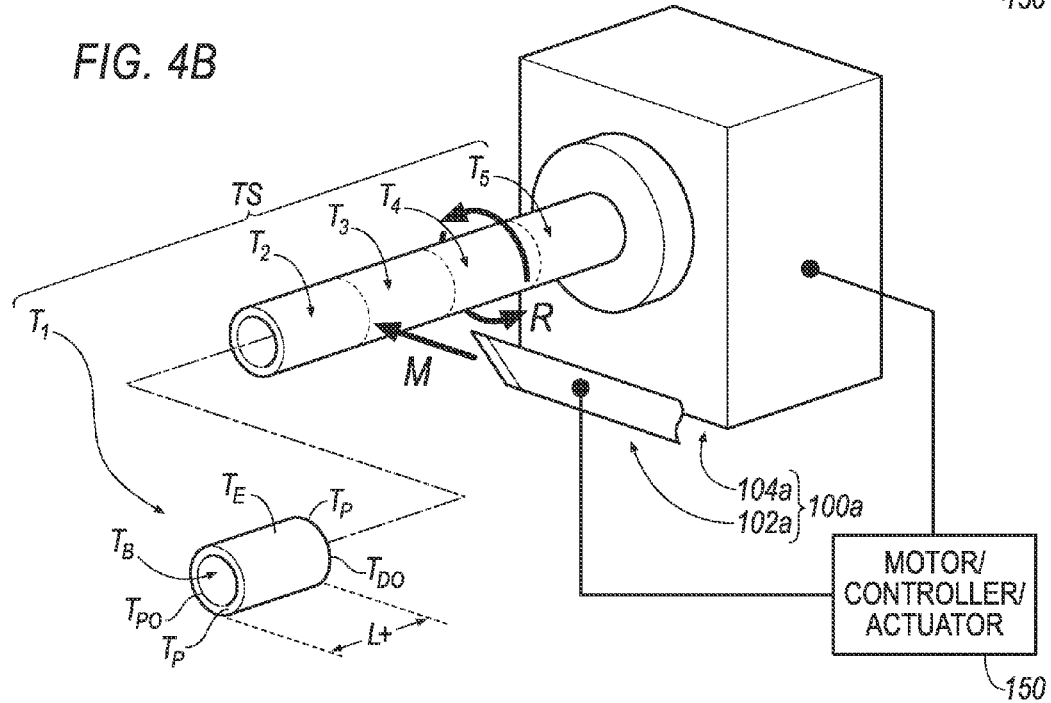

Referring to FIGS. 4A-4B, in a first step for forming the sleeve 10, a length of tube-shaped stock material, TS, a lathe 100a and a motor/controller/actuator 150 are shown. The lathe 100a may be a first device of one or more devices 100a-100e that are utilized for forming the sleeve 10. The lathe 100a may include a cutting member 102a and a rotating device 104a. The motor/controller/actuator 150 may permit manual and/or automatic control over movements of the lathe 100a.

The tube-shaped stock material, TS, may be removably-coupled to the rotating device 104a. The motor/controller/actuator 150 may cause the rotating device 150 to rotate, R, the tube-shaped stock material, TS. The motor/controller/actuator 150 may cause the cutting member 102a to movably-stroke, M, such that the cutting member 102a may trim the tube-shaped stock material, TS, into a plurality of segments $T_1$-$T_5$.

Each segment, $T_1$, $T_2$, $T_3$, $T_4$, $T_5$, of the plurality of segments, $T_1$-$T_5$, may include a length, L+ (see FIG. 4B), that is substantially equal to but slightly greater than the length, L, of the sleeve 10. After the devices 100b-100e conduct "work" (e.g., a bending process/stamping process) upon each segment, $T_1$, $T_2$, $T_3$, $T_4$, $T_5$, of the plurality of segments, $T_1$-$T_5$, the slightly-greater length, L+, permits formation of the flanges 30, 32, and, as a result of the "work," the lesser length, L, defined by the sleeve 10 is realized.

Referring to FIG. 4B, each segment, $T_1$, $T_2$, $T_3$, $T_4$, $T_5$, of the plurality of segments, $T_1$-$T_5$, may include a bore, $T_B$, that extends through its length. The bore, $T_B$, is bound by a proximal end, $T_P$, of the segment, $T_1$, and a distal end, $T_D$, of the segment, $T_1$. Access to the bore, $T_B$, is permitted by way of a proximal opening, $T_{PO}$, formed in the proximal end, $T_P$, of the segment, $T_1$, and by way of a distal opening, $T_{DO}$, formed in the distal end, $T_D$, of the segment, $T_1$.

Figure 5:
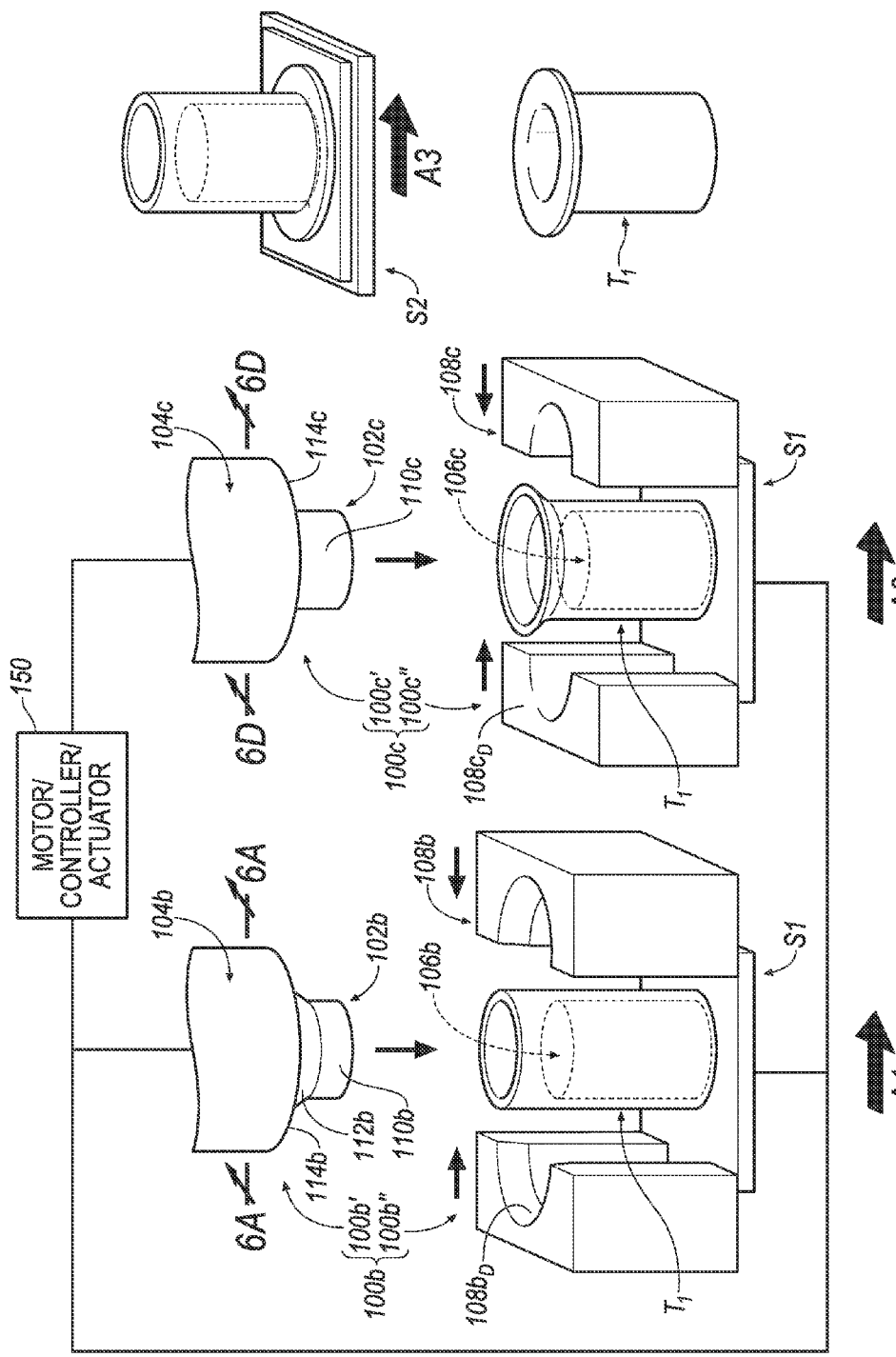
FIG. 5 illustrates (an) exemplary device(s) that further contribute(s) to an embodiment of a methodology for forming the sleeve of FIG. 1B.

Referring to FIG. 5, a segment, $T_1$, of the tube-shaped stock material, TS, may be placed upon a first support member, S1. In some implementations, the first support member, S1, may include a conveyor, carriage or transport device for moving the segment, $T_1$, of the tube-shaped stock material, TS, to one or more of the devices 100b and 100c (see FIG. 5) and/or 100d, 100e (see FIG. 7). If the first support member, S1, is a conveyor, carriage or transport device, the motor/controller/actuator 150 may control movement of the conveyor, carriage or transport device. In other implementations, the first support member, S1, may not be a conveyor or transporting device, and, in such an implementation, the first support member, S1, may include a lower half or lower portion of the one or more devices 100b, 100c; in such an implementation, the segment, $T_1$, of the tube-shaped stock material, TS, may be manually moved (e.g., by a user's hand), or, alternatively, automatically moved (e.g., by, for example, a robotic arm having pre-programmed movements) and placed upon the first support member, S1.

A second device 100b and a third device 100c are shown in FIG. 5. The second device 100b and the third device 100c may each be described as a die or stamping device respectively including an upper portion 100b', 100c' and a lower portion 100b", 100c". The upper portion 100b', 100c' may include a flange-shaping head 102b, 102c that extends away from a body portion 104b, 104c. The lower portion 100b'', 100c'' may include a centering post 106b, 106c extending away from the first support member, S1, and a clamp member 108b, 108c that is slidably-arranged above or upon the first support member, S1.

Referring to FIG. 6A, the second device 100b may be operated as follows. After the lathe 100a trims the segment, $T_1$, from the tube-shaped stock material, TS, the proximal end, $T_P$, of the segment, $T_1$, is arranged upon the first support member, S1, in a manner such that the centering post 106b is permitted to pass through the proximal opening, $T_{PO}$, of the segment, $T_1$, such that the centering post 106b may be arranged within the bore, $T_B$, of the segment, $T_1$. Then, the motor/controller/actuator 150 may cause the clamp member 108b to be moved, M1, from a disengaged orientation (see FIG. 6A) away from an exterior surface, $T_E$, of the segment, $T_1$, to an engaged orientation (see FIG. 6B) adjacent the exterior surface, $T_E$, of the segment, $T_1$. Once the clamp member 108b engages the exterior surface, $T_E$, of the segment, $T_1$, the motor/controller/actuator 150 may cause the upper portion 100b' to move, M2, from a disengaged orientation (see FIG. 6A) away from the distal end, $T_D$, of the segment, $T_1$, to an engaged orientation (see FIG. 6B) within the bore, $T_B$, of the segment, $T_1$, such that the flange-shaping head 102b is permitted to pass through the distal opening, $T_{DO}$, of the segment, $T_1$, and into the bore, $T_B$, of the segment, $T_1$.

The movement, M2, of the upper portion 100b' is limited to a first stroke, ST1 (FIG. 6A), that is defined by a distance. The first stroke, ST1, in combination with a geometry of the flange-shaping head 102b results in the segment, $T_1$, being deformed (see FIG. 6B) in a controlled manner that corresponds to the geometry of the flange-shaping head 102b.

The geometry of the flange-shaping head 102b is generally defined by a length, $L_{102b}$, a first, constant diameter, $D1_{102b}$, and a second, non-constant diameter, $D2_{102b}$. The flange-shaping head 102b extends away from the body portion 104b at a distance defined by the length, $L_{102b}$. The first, constant diameter, $D1_{102b}$, of the flange-shaping head 102b is generally defined by a head surface 110b of the flange-shaping head 102b whereas the second, non-constant diameter, $D2_{102b}$, is generally defined by a neck surface 112b of the flange-shaping head 102b. The neck surface 112b extends away from a shoulder surface 114b of the body portion 104b of the flange-shaping head 102b.

The first diameter, $D1_{102b}$, defined by head surface 110b is substantially equal to but slightly less than a diameter, $T_{BD}$, defined by the bore, $T_B$, of the segment, $T_1$. As stated above, the diameter, $D2_{102b}$, is a non-constant diameter defined by the neck surface 112b; in an implementation, as the neck surface 112b extends away from the head surface 110b, the second, non-constant diameter, $D2_{102b}$, is initially approximately equal to the first diameter, $D1_{102b}$, and then subsequently increases in diameter as the neck portion 112b extends away from the head surface 110b and toward the shoulder surface 114b. As the neck portion 112b extends away from the head surface 110b and toward the shoulder surface 114b, a cross-sectional view (see, e.g., FIG. 6A of the flange-shaping head 102b) may reveal that the neck surface 112b defining the second, non-constant diameter, $D2_{102b}$, extends away from the head surface 110b at an angle, θ1, approximately equal to about 45°.

Because the first diameter, $D1_{102b}$, defined by head surface 110b is substantially equal to but slightly less than a diameter, $T_{BD}$, defined by the bore, $T_B$, of the segment, $T_1$, and, because the second, non-constant diameter, $D2_{102b}$, extends away from the head surface 110b at an angle, θ1, approximately equal to 45°, when the upper portion 100b' moves, M2, at the stoke, ST1, the head surface 110b is permitted to be arranged within the bore, $T_B$, of the segment, $T_1$, whereas the neck surface 112b interferes with the distal end, $T_B$, of the segment, $T_1$. As a result of the interference arising from the neck surface 112b coming into contact with the distal end, $T_B$, of the segment, $T_1$, during the stroke, ST1, the neck surface 112b progressively comes into contact with an interior surface, $T_1$, of the segment, $T_1$ (as seen in FIG. 6B), and deforms a portion of the length, L+, of the segment, $T_1$, such that the portion of the length, L+, of the segment, $T_1$, is shaped in a substantially similar manner defined by the angle, θ1 (i.e., the portion of the length, L+, of the segment, $T_1$, is bent or "flowers" outwardly at an angle substantially similar to the angle, θ1). Because the proximal end, $T_P$, an interior surface, $T_1$, and the exterior surface, $T_E$, of the segment, $T_1$, are supported and retained by a combination of the first support member, S1, the post 106b and the clamp member 108b, the remaining portion of the segment, $T_1$, that is not contacted by the upper portion 100b' remains intact and is not deformed in orientation or thickness, T (see FIG. 6A).

Further, although not required, the clamp member 108b may include a distal end surface $108b_D$ that corresponds to the angle, θ1, of the neck surface 112b in order to maintain a controlled deformation of the bending or flowing orientation of the distal end, $T_B$, of the segment, $T_1$, according to the angle, θ1. Accordingly, as seen in FIG. 6B, when the upper portion 100b' is stroked, ST1, the neck surface 112b may be arranged directly opposite the distal end surface $108b_D$ of the clamp member 108b and be spaced apart by a distance equal to the thickness, T, of the segment, $T_1$.

Figures 6C, 6F:
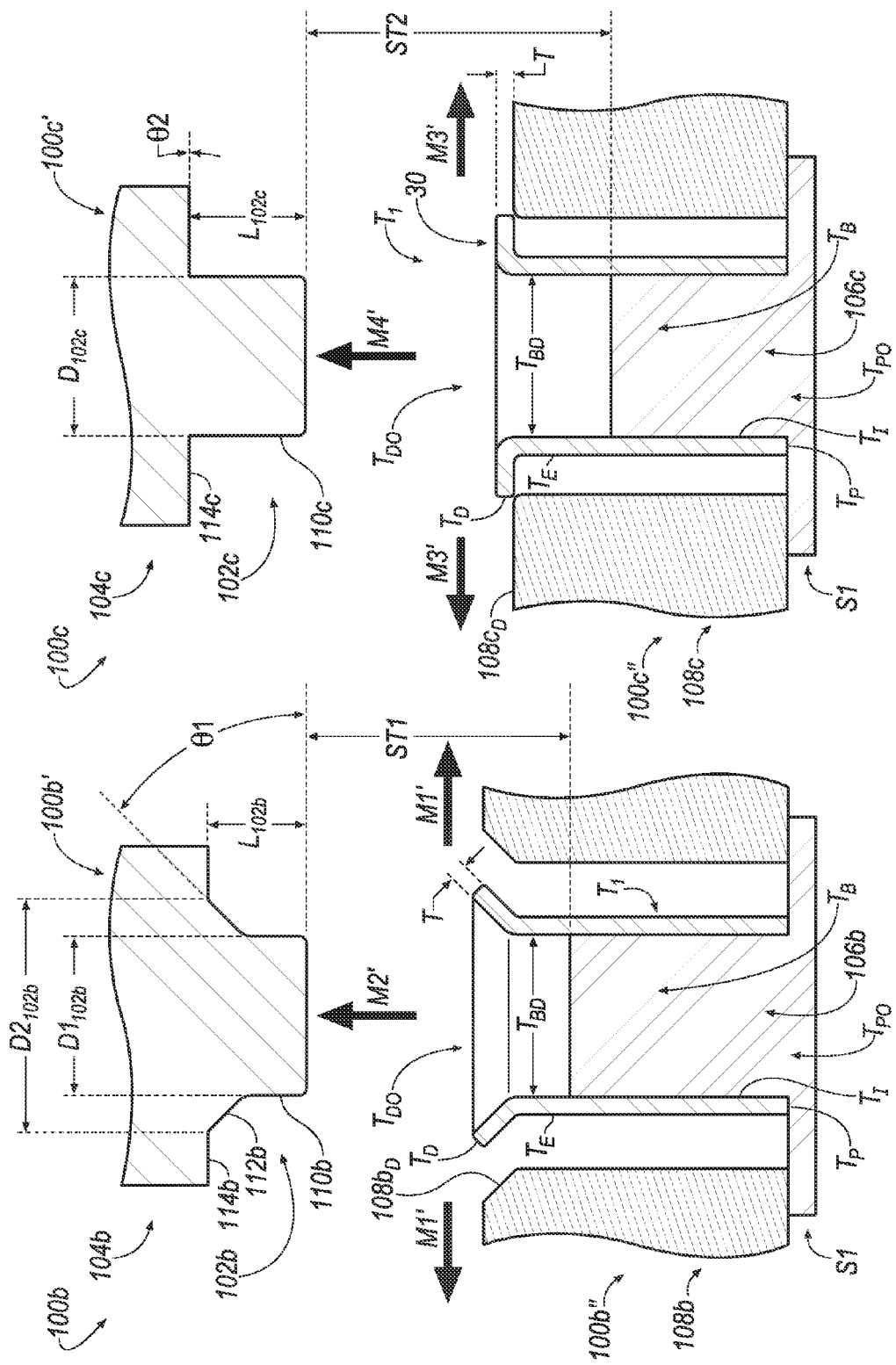

Referring to FIG. 6C, once the upper portion 100b' completes the movement according to the arrow, M2, thereby completing the stoke, ST1, the upper portion 100b' is moved according to the direction of arrow, M2', which is opposite the arrow, M2, such that: 1) the head surface 110b is withdrawn from the bore, $T_B$, of the segment, $T_1$, and 2) the neck surface 112b is moved away from and is no longer in direct contact with the interior surface, $T_1$, of the segment, $T_1$. Further, as seen in FIG. 6C, the clamp member 108b may be moved according to the direction of the arrow, M1', which is opposite the direction of the arrow, M1, such that the clamp member 108b no longer engages the exterior surface, $T_E$, of the segment, $T_1$. After completion of the movement of the second device 100b according to the direction of the arrows, M1', M2', the first support member, S1, while supporting the segment, $T_1$, deformed by the second device 100b may then be advanced to the third device 100c according to the direction of the arrow, A1 (see FIG. 5).

Referring to FIG. 6D, the second device 100c may be operated as follows. After the second device 100b deforms the segment, $T_1$, as described above in FIGS. 6A-6C, the proximal end, $T_P$, of the segment, $T_1$, is arranged upon the first support member, S1, in a manner such that the centering post 106c is permitted to pass through the proximal opening, $T_{PO}$, of the segment, $T_1$, such that the centering post 106c may be arranged within the bore, $T_B$, of the segment, $T_1$. Then, the motor/controller/actuator 150 may cause the clamp member 108c to be moved, M3, from a disengaged orientation (see FIG. 6D) away from an exterior surface, $T_E$, of the segment, $T_1$, to an engaged orientation (see FIG. 6E) adjacent the exterior surface, $T_E$, of the segment, $T_1$. Once the clamp member 108c engages the exterior surface, $T_E$, of the segment, $T_1$, the motor/controller/actuator 150 may cause the upper portion 100c' to move, M4, from a disengaged orientation (see FIG. 6D) away from the distal end, $T_B$, of the segment, $T_1$, to an engaged orientation (see FIG. 6E) within the bore, $T_B$, of the segment, $T_1$, such that the flange-shaping head 102c is permitted to pass through the distal opening, $T_{DO}$, of the segment, $T_1$, and into the bore, $T_B$, of the segment, $T_1$.

Although the centering post 106c and the clamp member 108c include different reference numerals (i.e. the letter "c" instead of the letter "b") when compared to the second device 100b, the centering post 106c and the clamp member 108c may be the same centering post 106b and clamp member 108b shown and described in FIGS. 6A-6C. For example, if the first support member, S1, is a shuttle or conveyor, the segment, $T_1$, may remain upon the shuttle or conveyor, and, therefore, centering post and clamp member may be the same throughout FIGS. 6A-6F; however, if the first support member, S1, is not a conveyor or shuttle, but, rather, a fixed portion of each device 100b, 100c, the segment, $T_1$, may be moved (e.g., by a user's hand or robotic arm) from the device 100b to the device 100c, and, therefore take on a different reference numeral. Accordingly, although the centering post 106c and the clamp member 108c includes different reference numerals (i.e. the letter "c" instead of the letter "b") some implementations of the invention may include a similar centering post and clamp member depending on, for example, the type of first support member, S1, that is utilized during the formation of the sleeve 10. Further, in some implementations, the centering post 106b, 106c may be the same, but, however, the clamp member 108b, 108c may have a different surface geometry; for example, each of the clamp members 108b, 108c may be defined by different surface geometry defined by at least for example the distal end surface $108b_D$, $108c_D$ of the clamp member 108b, 108c.

Referring to FIG. 6D, the movement, M4, of the upper portion 100c' is limited to a second stroke, ST2, defined by a distance. The second stroke, ST2, in combination with a geometry of the flange-shaping head 102c results in the segment, $T_1$, being further deformed (see FIG. 6E) in a controlled manner that corresponds to the geometry of the flange-shaping head 102c.

The geometry of the flange-shaping head 102c is generally defined by a length, $L_{102c}$, a constant diameter, $D_{102c}$. The flange-shaping head 102c extends away from the body portion 104c at a distance defined by the length, $L_{102c}$. The constant diameter, $D_{102c}$, of the flange-shaping head 102c is generally defined by a head surface 110c and a shoulder surface 114c that is substantially perpendicular to the head surface 110c at an angle, θ2, approximately equal to 0°; in an implementation, the flange-shaping head 102c of the third device 100c is notably different than the flange-shaping head 102b of the second device 100b in that the flange-shaping head 102c does not include a neck surface that connects the head surface 110c to the shoulder surface 114c whereas the flange-shaping head 102b includes the neck surface 112b connecting the head surface 110b to a shoulder surface 114b.

The diameter, $D_{102c}$, defined by head surface 110c is substantially equal to but slightly less than a diameter, $T_{BD}$, defined by the bore, $T_B$, of the segment, $T_1$. Because the diameter, $D_{102c}$, defined by head surface 110c is substantially equal to but slightly less than a diameter, $T_{BD}$, defined by the bore, $T_B$, of the segment, $T_1$, and, because the shoulder surface 114c is substantially perpendicular to the head surface 110c at an angle, θ2, approximately equal to 0°, when the upper portion 100c' moves, M4, at the stoke, ST2, the head surface 110c is permitted to be arranged within the bore, $T_B$, of the segment, $T_1$, whereas the previously deformed portion of the length, L+, of the segment, $T_1$, interferes with the movement, M4, of the upper portion 100c'. As a result of the interference arising from the previously deformed portion of the length, L+, of the segment, $T_1$, the shoulder surface 114c further deforms the previously-deformed portion of the length, L+, of the segment, $T_1$, such that the previously deformed portion of the length, L+, of the segment, $T_1$, is further shaped in a substantially similar manner defined by the angle, θ2 (i.e., the previously deformed distal end, $T_D$, of the segment, $T_1$, is further bent or "flowers" outwardly at an angle substantially similar to the angle, θ2). Because the proximal end, $T_P$, an interior surface, $T_I$, and the exterior surface, $T_E$, of the segment, $T_1$, are supported and retained by a combination of the first support member, S1, the post 106c and the clamp member 108c, the remaining portion of the segment, $T_1$, remains intact and is not deformed in orientation or thickness, T.

Further, although not required, the clamp member 108c may include a distal end $108c_D$ that corresponds to the angle, θ2, of the shoulder surface 114c in order to maintain a controlled deformation of the bending or flowing orientation of the distal end, $T_D$, of the segment, $T_1$, according to the angle, θ2. Accordingly, as seen in FIG. 6E, when the upper portion 100c' is stroked, ST2, the shoulder surface 114b may be arranged directly opposite the distal end surface $108c_D$ of the clamp member 108c and be spaced apart by a distance equal to the thickness, T, of the segment, $T_1$.

Referring to FIG. 6F, once the upper portion 100c' completes the movement according to the arrow, M4, thereby completing the stoke, ST2, the proximal flange 30 of the sleeve 10 is formed. The upper portion 100c' is then moved according to the direction of arrow, M4', which is opposite the arrow, M4, such that: 1) the head surface 110c is withdrawn from the bore, $T_B$, of the segment, $T_1$, and 2) the shoulder surface 114c is moved away from and no longer in direct contact with the interior surface, $T_I$, of the segment, $T_1$. Further, as seen in FIG. 6F, the clamp member 108c may be moved according to the direction of the arrow, M3', which is opposite the direction of the arrow, M3, such that the clamp member 108c no longer engages the exterior surface, $T_E$, of the segment, $T_1$.

After completion of the movement of the third device 100c according to the direction of the arrows, M3', M4', the first support member, S1, while supporting the segment, $T_1$, may be moved away from the third device 100c according to the direction of the arrow, A2. Then, as seen in FIG. 5, the further deformed segment, $T_1$, may be removed from the first support member, S1, and, subsequently, the proximal flange 30 may be disposed adjacent a second support member, S2. The second support member, S2, may be advanced toward the fourth device 100d (see FIG. 7) according to the direction of the arrow, A3.

Figure 7:
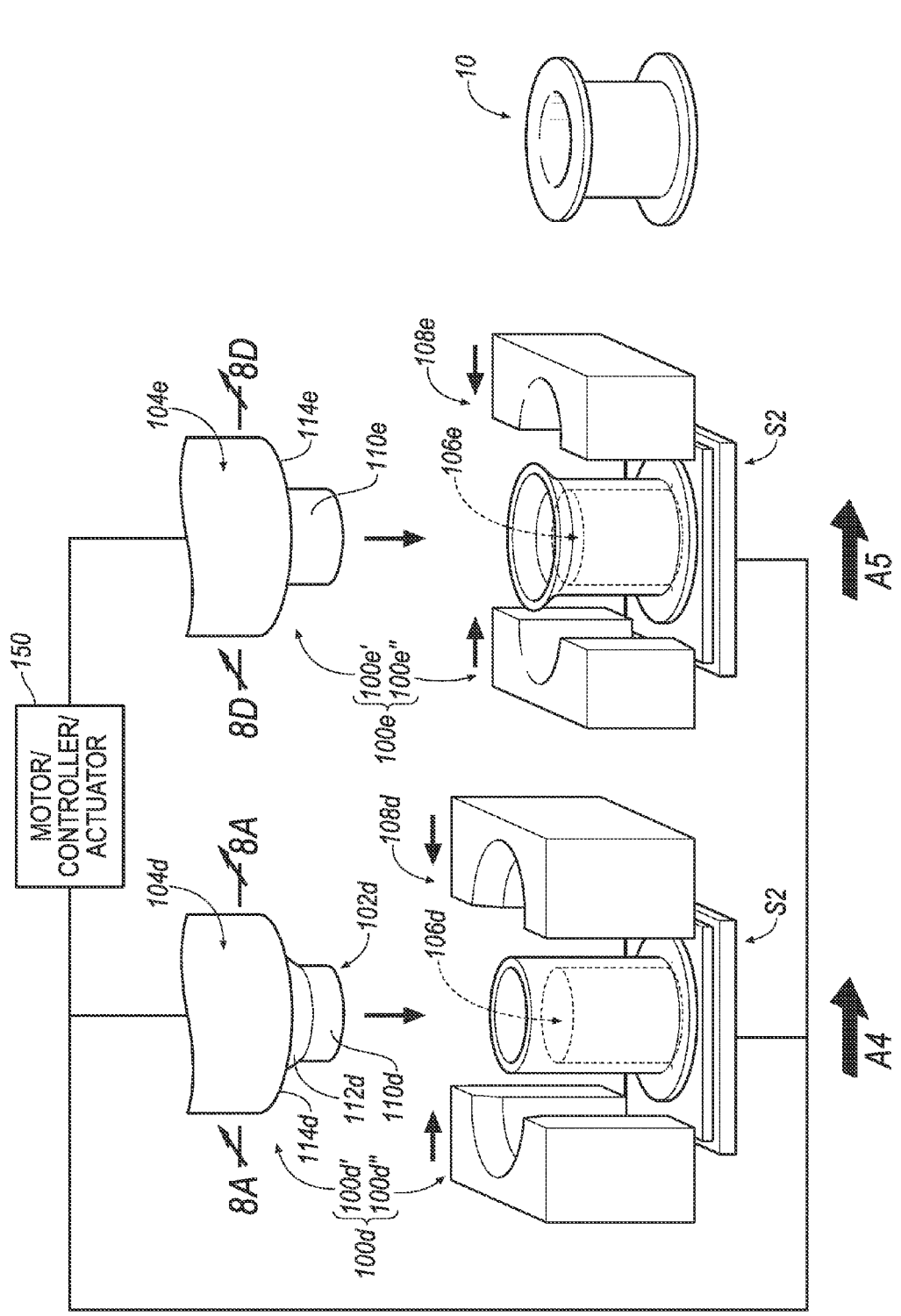
FIG. 7 illustrates (an) exemplary device(s) that further contribute(s) to an embodiment of a methodology for forming the sleeve of FIG. 1B.

Referring to FIG. 7, the fourth device 100d and the fifth device 100e are shown. The fourth device 100d and the fifth device 100e may each be described as a die or stamping device respectively including an upper portion 100d', 100e' and a lower portion 100d", 100e". The upper portion 100d', 100e' may include a flange-shaping head 102d, 102e that extends away from a body portion 104d, 104e. The lower portion 100d", 100e" may include a centering post 106d, 106e extending away from the second support member, S2, and a clamp member 108d, 108e that is slidably-arranged above or upon the second support member, S2.

Referring to FIG. 8A, the fourth device 100d may be operated as follows. After the third device 100c has further deformed the segment, $T_1$, in order to form the proximal flange 30, the distal end, $T_D$, of the segment, $T_1$, forming the proximal flange 30 is arranged proximate the second support member, S2, in a manner such that the centering post 106d is permitted to pass through the distal opening, $T_{DO}$, of the segment, $T_1$, such that the centering post 106d may be arranged within the bore, $T_B$, of the segment, $T_1$.

In some implementations, a proximal flange supporting member 116d may extend away from the centering post 106d. The proximal flange supporting member 116d may include a diameter, $D_{116d}$, that is greater than a diameter, $D_{106d}$, of the centering post 106d. The proximal flange supporting member 116d may be disposed adjacent the second support member, S2. When the centering post 106d passes through the distal opening, $T_{DO}$, of the segment, $T_1$, the outwardly-facing surface portion $16_O$ of the proximal flange surface 16 forming the proximal flange 30 is arranged adjacent the proximal flange supporting member 116d.

Then, the motor/controller/actuator 150 may cause the clamp member 108d to be moved, M5, from a disengaged orientation (see FIG. 8A) away from an exterior surface, $T_E$, of the segment, $T_1$, to an engaged orientation (see FIG. 8B) adjacent the exterior surface, $T_E$, of the segment, $T_1$. When arranged in the engaged orientation, a portion of a proximal surface 118d of the clamp member 108d may be disposed adjacent the inwardly-facing surface portion $16_I$ of the proximal flange surface 16 forming the proximal flange 30. As a result of the arrangement of: 1) the centering post 106d within the bore, $T_B$, of the segment, $T_1$, 2) the outwardly-facing surface portion $16_O$ of the proximal flange surface 16 adjacent the proximal flange supporting member 116d, and 3) the inwardly-facing surface portion $16_I$ of the proximal flange surface 16 adjacent the proximal surface 118d of the clamp member 108d, the lower portion 100d'' of the fourth device 100d retains the further deformed segment, $T_1$, in place such that forces transmitted to the further deformed segment, $T_1$, for forming the distal flange 32 (see FIG. 8E) will not upset or disturb a controlled thickness, T, of the proximal flange 30.

Once the clamp member 108d engages the exterior surface, $T_E$, of the segment, $T_1$, and the inwardly-facing surface portion $16_I$ of the proximal flange surface 16 forming the proximal flange 30, the motor/controller/actuator 150 may cause the upper portion 100d' to move, M6, from a disengaged orientation (see FIG. 8A) away from the proximal end, $T_P$, of the segment, $T_1$, to an engaged orientation (see FIG. 8B) within the bore, $T_B$, of the segment, $T_1$, such that the flange-shaping head 102d is permitted to pass through the proximal opening, $T_{PO}$, of the segment, $T_1$, and into the bore, $T_B$, of the segment, $T_1$.

The movement, M6, of the upper portion 100d' is limited to a third stroke, ST3 (FIG. 8A), defined by a distance. The third stroke, ST3, in combination with a geometry of the flange-shaping head 102d results in another portion of the length, L+, the segment, $T_1$, being deformed (see FIG. 8B) in a controlled manner that corresponds to the geometry of the flange-shaping head 102d.

The geometry of the flange-shaping head 102d is generally defined by a length, $L_{102d}$, a first, constant diameter, $D1_{102d}$, and a second, non-constant diameter, $D2_{102d}$. The flange-shaping head 102d extends away from the body portion 104d at a distance defined by the length, $L_{102d}$. The first, constant diameter, $D1_{102d}$, of the flange-shaping head 102d is generally defined by a head surface 110d of the flange-shaping head 102d whereas the second, non-constant diameter, $D2_{102d}$, is generally defined by a neck surface 112d of the flange-shaping head 102d that extends away from a shoulder surface 114d.

The first diameter, $D1_{102d}$, defined by head surface 110d is substantially equal to but slightly less than a diameter, $T_{BD}$, defined by the bore, $T_B$, of the segment, $T_1$. As stated above, the diameter, $D2_{102d}$, is a non-constant diameter defined by the neck surface 112d; in an implementation, as the neck surface 112d extends away from the head surface 110d, the second, non-constant diameter, $D2_{102d}$, is initially approximately equal to the first diameter, $D1_{102d}$, and then subsequently increases in diameter as the neck portion 112d extends away from the head surface 110d and toward the shoulder surface 114d. As the neck portion 112d extends away from the head surface 110d and toward the shoulder surface 114d, a cross-sectional view (see, e.g., FIG. 8A of the flange-shaping head 102d may reveal that the neck surface 112d defining the second, non-constant diameter, $D2_{102d}$, extends away from the head surface 110d at an angle, θ3, approximately equal to 45°.

Because the first diameter, $D1_{102d}$, defined by head surface 110d is substantially equal to but slightly less than a diameter, $T_{BD}$, defined by the bore, $T_B$, of the segment, $T_1$, and, because the second, non-constant diameter, $D2_{102d}$, extends away from the head surface 110d at an angle, θ3, approximately equal to 45°, when the upper portion 100d' moves, M6, at a third stoke, ST3, the head surface 110d is permitted to be arranged within the bore, $T_B$, of the segment, $T_1$, whereas the proximal end, $T_P$, of the segment, $T_1$, interferes with the movement, M6, of the upper portion 100d'. As a result of the interference arising from the proximal end, $T_P$, of the segment, $T_1$, the neck surface 112d is progressively disposed adjacent the interior surface, $T_I$, of the segment, $T_1$, and deforms the portion of the length, L+, of the segment, $T_1$, proximate the proximal end, $T_P$, of the segment, $T_1$, in a substantially similar manner defined by the angle, θ3 (i.e., the length, L+, of the segment, $T_1$, proximate the proximal end, $T_P$, of the segment, $T_1$, is bent or "flowers" outwardly at an angle substantially similar to the angle, θ3). Because the proximal flange 30, the interior surface, $T_I$, and the exterior surface, $T_E$, of the segment, $T_1$, are supported and retained by a combination of the second support member, S2, the post 106d and the clamp member 108d, the remaining portion of the segment, $T_1$, not contacted by the upper portion 100d' remains intact and is not deformed in orientation or thickness, T.

Further, although not required, the clamp member 108d may include a distal end $108d_D$ that corresponding to the angle, θ3, of the neck surface 112d in order to maintain a controlled deformation of the bending or flowing orientation of the proximal end, $T_P$, of the segment, $T_1$, according to the angle, θ3. Accordingly, as seen in FIG. 8B, when the upper portion 100d' is stroked, ST3, the neck surface 112d may be arranged directly opposite the distal end surface $108d_D$ of the clamp member 108d and be spaced apart by a distance equal to the thickness, T, of the segment, $T_1$.

Referring to FIG. 8C, once the upper portion 100d' completes the movement according to the arrow, M6, thereby completing the third stoke, ST3, the upper portion 100d' is moved according to the direction of arrow, M6', which is opposite the arrow, M6, such that: 1) the head surface 110d is withdrawn from the bore, $T_B$, of the segment, $T_1$, and 2) the neck surface 112d is moved away from and no longer in direct contact with the interior surface, $T_I$, of the segment, $T_1$. Further, as seen in FIG. 8C, the clamp member 108d may be moved according to the direction of the arrow, M5', which is opposite the direction of the arrow, M5, such that the clamp member 108d no longer engages the exterior surface, $T_E$, of the segment, $T_1$. After completion of the movement of the second device 100d according to the direction of the arrows, M5', M6', the second support member, S2, while supporting the further deformed segment, $T_1$, deformed by the second device 100d may then be advanced to the fifth device 100e according to the direction of the arrow, A4 (see FIG. 7).

Referring to FIG. 8D, the fifth device 100e may be operated as follows. After the fourth device 100d deforms the segment, $T_1$, as described above in FIGS. 8A-8C, the proximal flange 30 formed by the distal end, $T_D$, of the segment, $T_1$, is arranged upon the second support member, S2, in a manner such that the centering post 106e is permitted to pass through the distal opening, $T_{DO}$, of the segment, $T_1$, such that the centering post 106e may be arranged within the bore, $T_B$, of the segment, $T_1$.

In some implementations, a proximal flange supporting member 116e may extend away from the centering post 106e. The proximal flange supporting member 116e may include a diameter, $D_{116e}$, that is greater than a diameter, $D_{106e}$, of the centering post 106e. The proximal flange supporting member 116e may be disposed adjacent the second support member, S2. When the centering post 106e passes through the distal opening, $T_{DO}$, of the segment, $T_1$, the outwardly-facing surface portion $16_O$ of the proximal flange surface 16 forming the proximal flange 30 is arranged adjacent the proximal flange supporting member 116e.

Then, the motor/controller/actuator 150 may cause the clamp member 108e to be moved, M7, from a disengaged orientation (see FIG. 8D) away from an exterior surface, $T_E$, of the segment, $T_1$, to an engaged orientation (see FIG. 8E) adjacent the exterior surface, $T_E$, of the segment, $T_1$. When arranged in the engaged orientation, a portion of a proximal surface 118e of the clamp member 108e may be disposed adjacent the inwardly-facing surface portion $16_I$ of the proximal flange surface 16 forming the proximal flange 30. As a result of the arrangement of: 1) the centering post 106e within the bore, $T_B$, of the segment, $T_1$, 2) the outwardly-facing surface portion $16_O$ of the proximal flange surface 16 adjacent the proximal flange supporting member 116e, and 3) the inwardly-facing surface portion $16_I$ of the proximal flange surface 16 adjacent the proximal surface 118e of the clamp member 108e, the lower portion 100e" of the fifth device 100e retains the further deformed segment, $T_1$, in place such that forces transmitted to the further deformed segment, $T_1$, for forming the distal flange 32 (see FIG. 8E) will not upset or disturb a controlled thickness, T, of the proximal flange 30.

Although the centering post 106e and the clamp member 108e include different reference numerals (i.e. the letter "d" instead of the letter "e") when compared to the fourth device 100d, the centering post 106e and the clamp member 108e may be the same centering post 106d and clamp member 108d shown and described in FIGS. 7A-7C. For example, if the second support member, S2, is a shuttle or conveyor, the segment, $T_1$, may remain upon the shuttle or conveyor, and, therefore, centering post and clamp member may be the same throughout FIGS. 8A-8F; however, if the second support member, S2, is not a conveyor or shuttle, but, rather, a fixed portion of each device 100d, 100e, the segment, $T_1$, may be moved (e.g., by a user's hand or robotic arm) from the device 100d to the device 100e, and, therefore take on a different reference numeral. Accordingly, although the centering post 106e and the clamp member 108e includes different reference numerals (i.e. the letter "e" instead of the letter "d") some implementations of the invention may include a similar centering post and clamp member depending on, for example, the type of second support member, S2, that is utilized during the formation of the sleeve 10.

Referring to FIG. 8D, the movement, M8, of the upper portion 100e' is limited to a fourth stroke, ST4, defined by a distance. The fourth stroke, ST4, in combination with a geometry of the flange-shaping head 102e results in the portion of the length, L+, of the segment, $T_1$, proximate the proximal end, $T_P$, of the segment, $T_1$, being further deformed (see FIG. 8E) in a controlled manner that corresponds to the geometry of the flange-shaping head 102e.

The geometry of the flange-shaping head 102e is generally defined by a length, $L_{102e}$, a constant diameter, $D_{102e}$. The flange-shaping head 102e extends away from the body portion 104e at a distance defined by the length, $L_{102e}$. The constant diameter, $D_{102e}$, of the flange-shaping head 102e is generally defined by a head surface 110e and a shoulder surface 114e that is substantially perpendicular to the head surface 110e at an angle, θ4, approximately equal to 0°; in an implementation, the flange-shaping head 102e of the third device 100e is notably different than the flange-shaping head 102d of the fourth device 100d in that the flange-shaping head 102e does not include a neck surface that connects the head surface 110e to the shoulder surface 114e whereas the flange-shaping head 102d includes the neck surface 112d connecting the head surface 110d to a shoulder surface 114d.

The diameter, $D_{102e}$, defined by head surface 110e is substantially equal to but slightly less than a diameter, $T_{BD}$, defined by the bore, $T_B$, of the segment, $T_1$. Because the diameter, $D_{102e}$, defined by head surface 110e is substantially equal to but slightly less than a diameter, $T_{BD}$, defined by the bore, $T_B$, of the segment, $T_1$, and, because the shoulder surface 114e is substantially perpendicular to the head surface 110e at an angle, θ4, approximately equal to 0°, when the upper portion 100e' moves, M8, at the fourth stoke, ST4, the head surface 110e is permitted to be arranged within the bore, $T_B$, of the segment, $T_1$, whereas the previously deformed portion of the length, L+, of the segment, $T_1$, proximate the proximal end, $T_P$, of the segment, $T_1$, interferes with the movement, M8, of the upper portion 100e'. As a result of the interference arising from the previously deformed portion of the length, L+, of the segment, $T_1$, proximate the proximal end, $T_P$, of the segment, $T_1$, the shoulder surface 114e further deforms the previously-deformed portion of the length, L+, of the segment, $T_1$, proximate the proximal end, $T_P$, of the segment, $T_1$, such that the previously portion of the length, L+, of the segment, $T_1$, proximate the proximal end, $T_P$, of the segment, $T_1$, is further shaped in a substantially similar manner defined by the angle, θ4 (i.e., the previously deformed portion of the length, L+, of the segment, $T_1$, proximate the proximal end, $T_P$, of the segment, $T_1$, is further bent or "flowers" outwardly at an angle substantially similar to the angle, θ4). Because the distal end, $T_D$, an interior surface, $T_I$, and the exterior surface, $T_E$, of the segment, $T_1$, are supported and retained by a combination of the second support member, S2, the post 106e and the clamp member 108e, the remaining portion of the segment, $T_1$, that is not contacted by the upper portion 100e' remains intact and is not deformed in orientation or thickness, T.

Further, although not required, the clamp member 108e may include a distal end $108e_D$ that corresponds to the angle, θ4, of the shoulder surface 1144 in order to maintain a controlled deformation of the bending or flowing orientation of the proximal end, $T_P$, of the segment, $T_1$, according to the angle, θ4. Accordingly, as seen in FIG. 8E, when the upper portion 100e' is stroked, ST4, the shoulder surface 114e may be arranged directly opposite the distal end surface $108e_D$ of the clamp member 108e and be spaced apart by a distance equal to the thickness, T, of the segment, $T_1$.

Referring to FIG. 8F, once the upper portion 100e' completes the movement according to the arrow, M8, thereby completing the fourth stoke, ST4, the distal flange 32 of the sleeve 10 is formed. The upper portion 100e' is then moved according to the direction of arrow, M8', which is opposite the arrow, M8, such that: 1) the head surface 110e is withdrawn from the bore, $T_B$, of the segment, $T_1$, and 2) the shoulder surface 114e is moved away from and no longer in direct contact with the interior surface, $T_I$, of the segment, $T_1$. Further, as seen in FIG. 8F, the clamp member 108e may be moved according to the direction of the arrow, M7', which is opposite the direction of the arrow, M7, such that the clamp member 108e no longer engages the exterior surface, $T_E$, of the segment, $T_1$.

After completion of the movement of the fifth device 100e according to the direction of the arrows, M7', M8', the second support member, S2, while supporting the segment, $T_1$, may be moved away from the fifth device 100e according to the direction of arrow, A5 (see FIG. 7). As seen in FIG. 7, as a result of the strokes, ST1, ST2, ST3, ST4, of the devices 100a, 100b, 100c, 100d, the segment, $T_1$, is formed into the sleeve 10, The sleeve 10 may be removed from the second support member, S2, for subsequent attachment to the control arm 52 as described above.

As seen in FIGS. 6A-6B and 8A-8B, the upper portions 100b', 100d' of the devices 100b, 100d include a substantially similar surface geometry (see surfaces 110b-114b and 110d-114d) defining the flange-shaping head 102b, 102d (i.e., both of the flange-shaping heads 102b, 102d deform the portion of the length, L+, of the segment, $T_1$, at a similar angle, θ1/θ3, (e.g., the similar angle, θ1/θ3, being approximately equal to about 45°). Similarly, as seen in FIGS. 6D-6E and 8D-8E, the upper portions 100c', 100e' of the devices 100c, 100e include a substantially similar surface geometry (see surfaces 110c, 114c and 110e, 114e) defining the flange-shaping head 102c, 102e (i.e., both of the flange-shaping heads 102c, 102e deform the portion of the length, L+, of the segment, $T_1$, at a similar angle, θ2/θ4, (e.g., the similar angle, θ2/θ4, being approximately equal to about 0°). Accordingly, in some implementations, the upper portions 100b', 100d' and 100c', 100e' may each be the same flange-shaping head; thus, in some implementations, the segment, $T_1$, may be cycled past the upper portions 100b', 100c' twice with the first cycle utilizing the first support member, S1, and the second cycle including the segment, $T_1$, being "flipped" or "turned over" while being supported by the second support member, S2.

In view of an implementation described above, each of the proximal end, $T_P$, and the distal end, $T_D$, of the segment, $T_1$, is formed in a two-step process including a first step and a second step. The first step includes shaping the proximal end, $T_P$/distal end, $T_D$, of the segment, $T_1$, at a 45° angle relative an interior surface, $T_I$, and an exterior surface $T_E$ of the segment, $T_1$. The second step includes further shaping the proximal end, $T_P$/distal end $T_D$, of the segment, $T_1$, from the 45° angle to a 0° angle relative an interior surface, $T_I$, and an exterior surface $T_E$ of the segment, $T_1$. By utilize a two-step forming process, each of the proximal flange 30, distal flange 32 and intermediate body 34 of the sleeve 10 may include a substantially similar, constant thickness, T, such that any variation of the substantially similar thickness, T, proximate "shaped transition regions" at about the location of the proximal arcuate surface 22, the interior distal arcuate surface 24, the exterior proximal arcuate surface 26 and the exterior distal arcuate surface 28 where the proximal flange 30 and the distal flange 32 each deviate away or extend away from the intermediate body 34 are limited or negligible; thus, the sleeve 10 maintains a substantially consistent rigidity throughout its entire length, L, which may result in an improved suspension assembly including components formed in a different forming methodology (e.g., a "deep drawn" forming methodology).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A sleeve for assembling into a sub-assembly including a control arm of a vehicular suspension assembly prepared by a process comprising the steps of:
   providing a tubular segment having a length, a proximal end, a distal end, a bore extending through the tubular segment from the proximal end to the distal end and an interior surface defining the bore;
   firstly shaping a first portion of the length proximate the distal end of the tubular segment to include a proximal flange;
   secondly shaping a second portion of the length proximate the proximal end of the tubular segment to include a distal flange; and
   wherein a third portion of the length of the tubular segment forms an intermediate body extending between the proximal flange and the distal flange, wherein the length of the tubular segment includes a substantially constant and uniform thickness after the firstly shaping step and the secondly step.

2. The sleeve prepared by the process according to claim 1, wherein the providing step includes the step of:
   obtaining the tubular segment from a length of the tube-shaped stock material.

3. The sleeve prepared by the process according to claim 2, wherein the obtaining step further includes the step of:
   arranging the length of tube-shaped stock material upon a rotating device of a lathe;
   utilizing the rotating device of the lathe for rotating the length of the tube-shaped stock material; and
   utilizing a cutting member of the lathe for trimming a portion of the length of the tube-shaped stock material equal to the length of the tubular segment, wherein the trimmed portion of the length of the tube-shaped stocked material is the tubular segment.

4. The sleeve prepared by the process according to claim 1, wherein the firstly shaping step includes the steps of:
   arranging the proximal end of the tubular segment upon a first support member,
   moving a first flange-shaping head including a surface geometry defined at least in part by a first angle from:
      a first orientation away from and not in contact with one or more of the distal end and the interior surface of the tubular segment to
      a second orientation in contact with one or more of the distal end and the interior surface of the tubular segment for:
         deforming the first portion of the length of the tubular segment proximate the distal end of the tubular segment outwardly at an angle substantially similar to the first angle of the surface geometry of the first flange-shaping head.

5. The sleeve prepared by the process according to claim 4, wherein the first angle is approximately 45°.

6. The sleeve prepared by the process according to claim 5, wherein the firstly shaping step further includes the steps of:
   moving a second flange-shaping head including a surface geometry defined by a second angle from:

a first orientation away from and not in contact with one or more of the distal end and the interior surface of the tubular segment to a second orientation in contact with one or more of the distal end and the interior surface of the tubular segment for:

further deforming the first portion of the length of the tubular segment proximate the distal end of the tubular segment further outwardly at an angle substantially similar to the second angle of the surface geometry of the second flange-shaping head for forming the proximal flange of the sleeve.

7. The sleeve prepared by the process according to claim 6, wherein the second angle is approximately 0°.

8. The sleeve prepared by the process according to claim 7, wherein after the firstly shaping step but prior to the secondly shaping step, the process further comprises the steps of:

removing the tubular segment from being arranged upon the first support member; and arranging an outwardly-facing surface portion of the proximal flange of the sleeve upon a second support member such that the proximal flange is disposed adjacent the second support member while the proximal end of the tubular segment faces away from the second support member.

9. The sleeve prepared by the process according to claim 8, wherein the secondly shaping step includes the steps of:

moving a third flange-shaping head including a surface geometry defined at least in part by a third angle from:

a first orientation away from and not in contact with one or more of the proximal end and the interior surface of the tubular segment to a second orientation in contact with one or more of the proximal end and the interior surface of the tubular segment for:

deforming the second portion of the length of the tubular segment proximate the distal end of the tubular segment outwardly at an angle substantially similar to the third angle of the surface geometry of the third flange-shaping head.

10. The sleeve prepared by the process according to claim 9, wherein the third angle is approximately 45°.

11. The sleeve prepared by the process according to claim 10, wherein the secondly shaping step further includes the steps of:

moving a fourth flange-shaping head including a surface geometry defined by a fourth angle from:

a first orientation away from and not in contact with one or more of the proximal end and the interior surface of the tubular segment to a second orientation in contact with one or more of the proximal end and the interior surface of the tubular segment for:

further deforming the first portion of the length of the tubular segment proximate the proximal end of the tubular segment further outwardly at an angle substantially similar to the fourth angle of the surface geometry of the fourth flange-shaping head for forming the distal flange of the sleeve.

12. The sleeve prepared by the process according to claim 11, wherein the fourth angle is approximately 0°.

* * * * *